TRANSFER AND STORAGE APPARATUS

Filed Dec. 24, 1958 17 Sheets-Sheet 1

INVENTORS:
PHILIP H. LANHAM
KARL D. JACK
JOHN J. HARVATH

BY Gravely, Lieder & Woodruff
ATTORNEYS.

TRANSFER AND STORAGE APPARATUS

INVENTORS:
PHILIP H. LANHAM
KARL D. JACK
JOHN J. HARVATH
BY Gravely, Lieder & Woodruff
ATTORNEYS.

INVENTORS:
PHILIP H. LANHAM
KARL D. JACK
JOHN J. HARVATH

By Gravely, Lieder & Woodruff
ATTORNEYS.

Nov. 6, 1962 P. H. LANHAM ET AL 3,062,352

TRANSFER AND STORAGE APPARATUS

Filed Dec. 24, 1958 17 Sheets-Sheet 4

INVENTORS.
PHILIP H. LANHAM
KARL D. JACK
JOHN J. HARVATH

By Gravely, Lieder & Woodruff
ATTORNEYS.

INVENTORS:
PHILIP H. LANHAM
KARL D. JACK
JOHN J. HARVATH
BY Gravely, Lieder & Woodruff
ATTORNEYS.

INVENTORS
PHILIP H. LANHAM
KARL D. JACK
JOHN J. HARVATH
BY Gravely, Lieder & Woodruff
ATTORNEYS.

INVENTORS:
PHILIP H. LANHAM
KARL D. JACK
JOHN J. HARYATH
By Gravely, Lieder & Woodruff
ATTORNEYS.

Nov. 6, 1962 P. H. LANHAM ET AL 3,062,352

TRANSFER AND STORAGE APPARATUS

Filed Dec. 24, 1958 17 Sheets-Sheet 8

INVENTORS:
PHILIP H. LANHAM
KARL D. JACK
JOHN J. HARVATH

By Gravely, Lieder & Woodruff
ATTORNEYS.

TRANSFER AND STORAGE APPARATUS

Filed Dec. 24, 1958 17 Sheets-Sheet 9

INVENTORS:
PHILIP H. LANHAM
KARL D. JACK
JOHN J. HARYATH

By Gravely, Lieder & Woodruff
ATTORNEYS.

INVENTORS:
PHILIP H. LANAM
KARL D. JACK
JOHN J. HARVATH
BY Gravely, Lieder & Woodruff
ATTORNEYS.

INVENTORS:
PHILIP H. LANHAM
KARL D. JACK
JOHN J. HARVATH
By Gravely, Lieder & Woodruff
ATTORNEYS.

Nov. 6, 1962 P. H. LANHAM ETAL 3,062,352

TRANSFER AND STORAGE APPARATUS

Filed Dec. 24, 1958 17 Sheets-Sheet 12

INVENTORS.
PHILIP H. LANHAM
KARL D. JACK
JOHN J. HARVATH

By Gravely, Lieder & Woodruff
ATTORNEYS.

TRANSFER AND STORAGE APPARATUS

INVENTORS.
PHILIP H. LANHAM
KARL D. JACK
JOHN J. HARVATH
By Gravely, Lieder & Woodruff
ATTORNEYS.

TRANSFER AND STORAGE APPARATUS

Filed Dec. 24, 1958 17 Sheets-Sheet 14

INVENTORS:
PHILIP H. LANHAM
KARL D. JACK
JOHN J. HARVATH
By Gravely, Lieder & Woodruff
ATTORNEYS.

Nov. 6, 1962 P. H. LANHAM ET AL 3,062,352

TRANSFER AND STORAGE APPARATUS

Filed Dec. 24, 1958 17 Sheets-Sheet 15

INVENTORS:
PHILIP H. LANHAM
KARL D. JACK
JOHN J. HARVATH

By Gravely, Lieder & Woodruff
ATTORNEYS.

TRANSFER AND STORAGE APPARATUS

Filed Dec. 24, 1958 17 Sheets-Sheet 16

INVENTORS:
PHILIP H. LANHAM
KARL B. JACK
JOHN J. HARVATH

By Gravely, Liedes & Woodruff
ATTORNEYS.

TRANSFER AND STORAGE APPARATUS

Filed Dec. 24, 1958 17 Sheets-Sheet 17

INVENTORS:
PHILIP H. LANHAM
KARL D. JACK
JOHN J HARVATH

BY Gravely, Lieder & Woodruff
ATTORNEYS.

United States Patent Office 3,062,352

Patented Nov. 6, 1962

3,062,352

TRANSFER AND STORAGE APPARATUS

Philip H. Lanham, Warson Woods, Karl D. Jack, Normandy, and John J. Harvath, St. Louis, Mo., assignors to Lewis-Howe Company, St. Louis, Mo., a corporation of Delaware Filed Dec. 24, 1958, Ser. No. 782,897
38 Claims. (Cl. 198—19)

Figures 1, 2, 2A:
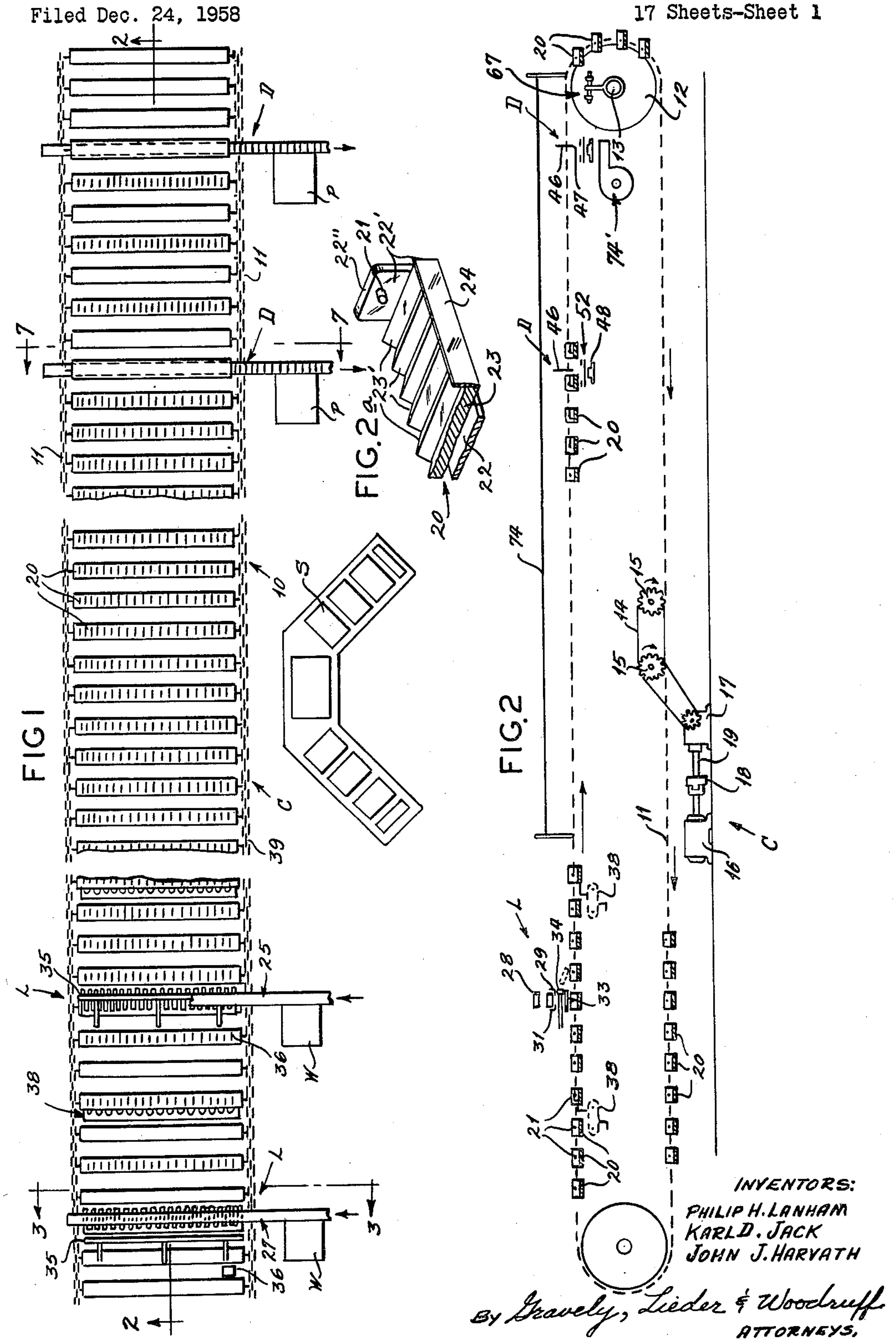

This invention relates generally to the conveyor art and more particularly to transfer and storage apparatus for loading, conveying and unloading products during the manufacture or packaging thereof.

In the past many problems have arisen with regard to the handling or transfer of consumer products between different processing stations during manufacturing and, although many conveying devices have been devised, none of them has been entirely satisfactory for fragile types of products. In particular, one of the most common problems in the past has been the failure to provide an adequate or continuous supply of products to one processing station from the preceding processing station whereby down-time and loss of production results. The problem is particularly acute where fragile products are being processed, and where jamming or like mechanical shutdown of the preceding processing mechanism may easily occur. Accordingly, mere multiplication of these processing mechanisms alone will not assure a continuous supply of products to the next processing mechanism. Another deficiency of the prior art is a failure to provide a device for handling, or which may easily be adapted to handle, all types of consumer products.

Although the present apparatus may be utilized between various processes or mechanisms in the manufacture of consumer products, it will be disclosed as a mechanism for transferring products from wrapping machines to packaging units. In this respect, it is frequently desirable to simultaneously deliver the particular product to different stations for further processing, additional wrapping in groups having different quantities or packaging in different size containers. However, the prior art has not provided apparatus flexible enough to meet this requirement.

Furthermore, for the purpose of illustration the present invention will be disclosed as an apparatus for handling cylindrical rolls of wafers or tablets and transferring them from a roll wrapping station to a packaging station. However, it will be apparent that the present apparatus may be utilized for the handling of wrapped or unwrapped bars of soap, vacuum tubes, spark plugs, and a multitude of other products.

It is an object of the present invention to provide a novel transfer and storage apparatus for moving consumer products between processing stations. More particularly, it is an object to provide a loading apparatus or device for transferring products to a conveying means from a processing station and an unloading apparatus or device for removing products from the conveying means for transmittal to another processing station. Specifically, it is an object to provide a master storage means in the form of a conveyor, loading apparatus for selectively loading a plurality of products onto the conveyor and unloading apparatus for selectively removing a plurality of products from the conveyor.

Another object is to provide a novel automatically operating apparatus having a master storage conveyor and loading and unloading means therefor each of which is provided with primary storage means for increasing the reserve capacity and utility of the apparatus. It is also an object to provide a master storage conveyor adapted to receive products from a plurality of loading means to maintain the conveyor in loaded condition, and from which products may be unloaded at a plurality of stations—each of the loading and unloading means having auxiliary storage means whereby a continuous supply of products to the delivery or takeoff stations is assured in the event of down-time at the loading stations.

Another object of the present invention is to provide a novel automatic loading apparatus for transferring products to a continuous conveyor having a plurality of flights or carriers, the loading apparatus including sensing means for selecting an unloaded flight on which the products are placed. It is also an object to provide the loading apparatus with intermediate storage means on which products are deposited from an intermittent conveying means from a first processing station and from which the products are deposited on an empty flight of the conveyor.

An object is to provide the loading apparatus with sensing and phasing or timing means for depositing a plurality of packages on the intermediate storage means only when it is unloaded.

Another object of the present invention is to provide a novel automatic unloading or discharge apparatus for removing products from a continuous conveyor having flights or carriers, the unloading apparatus having intermediate storage means on which the products are deposited from the conveyor and from which the products are transferred to an intermittent conveying means for delivery to a second processing station.

An object of the present invention is to operate the unloading apparatus conveyor means only in response to a signal from the second processing station or as products are required by it. A further object is to provide for selectively removing products from a flight of the conveyor only when the intermediate storage means is unloaded, and other means for transferring products to the unloading apparatus conveyor means when it is empty.

A further object of the present invention is to provide intermittently operating mechanism for aligning products on the conveyor flights.

A still further object is to provide fully automatic means for stopping or de-energizing the operation of the entire apparatus or selected portions thereof when an accident, malfunction or jam occurs. Specifically, it is an object to provide electrical means for stopping the loading device, the discharge device or the entire apparatus in case of jams, and it is also an object to provide automatic means for clearing jams at the loading and discharge devices.

It is an object to provide an automatic apparatus which will correct for jam conditions that occur through a condition of the product, and which will indicate a jam condition as a result of mechanical or electrical malfunction whereby immediate correction or compensation may be made thereby eliminating necessity for frequent auditing or preventative maintenance checks.

Another object is to provide an apparatus adapted for computer programing in which all of the devices thereof are interrelated and operate in a correlated operation for optimum efficiency.

Another object is to provide an apparatus that will transfer or store products, as required, between first and second stations, and which maintains the products in isolated or spaced relation to the point of delivery whereby the products are protected from breakage or other damage. A further object is to provide an apparatus with identity control, i.e., that will convey labeled products without reversing the position of the products or otherwise affecting the readability of the labels so that the products may be packaged with all of the labels being readable from the same direction. Another object is to provide a fully automatically operating apparatus that is responsive to the product in that functioning of the devices and mechanisms of the apparatus are triggered or controlled by the movement or presence of the product or the need for additional products.

Still other objects and advantages of the present invention will be apparent hereinafter.

Briefly, the present invention comprises an automatically operating transfer and storage apparatus for moving products between processing stations and including master storage and conveying means having pivotally connected spaced flights, loading means having a primary storage area to which products are transferred from a loading conveyor and from which the products are discharged to the flights of the conveying means, and discharge means having another primary storage area to which products are transferred from the flights of the conveying means and from which products are discharged onto a discharge conveyor. The invention also comprises electrical means for controlling the operation of the apparatus and each of the loading and discharge means, and mechanisms for assuring the continuous automatic operation of the apparatus and the devices.

Figures 3, 4A, 4B, 4C, 4D, 5, 6, 7, 8A, 8B, 8C, 9:
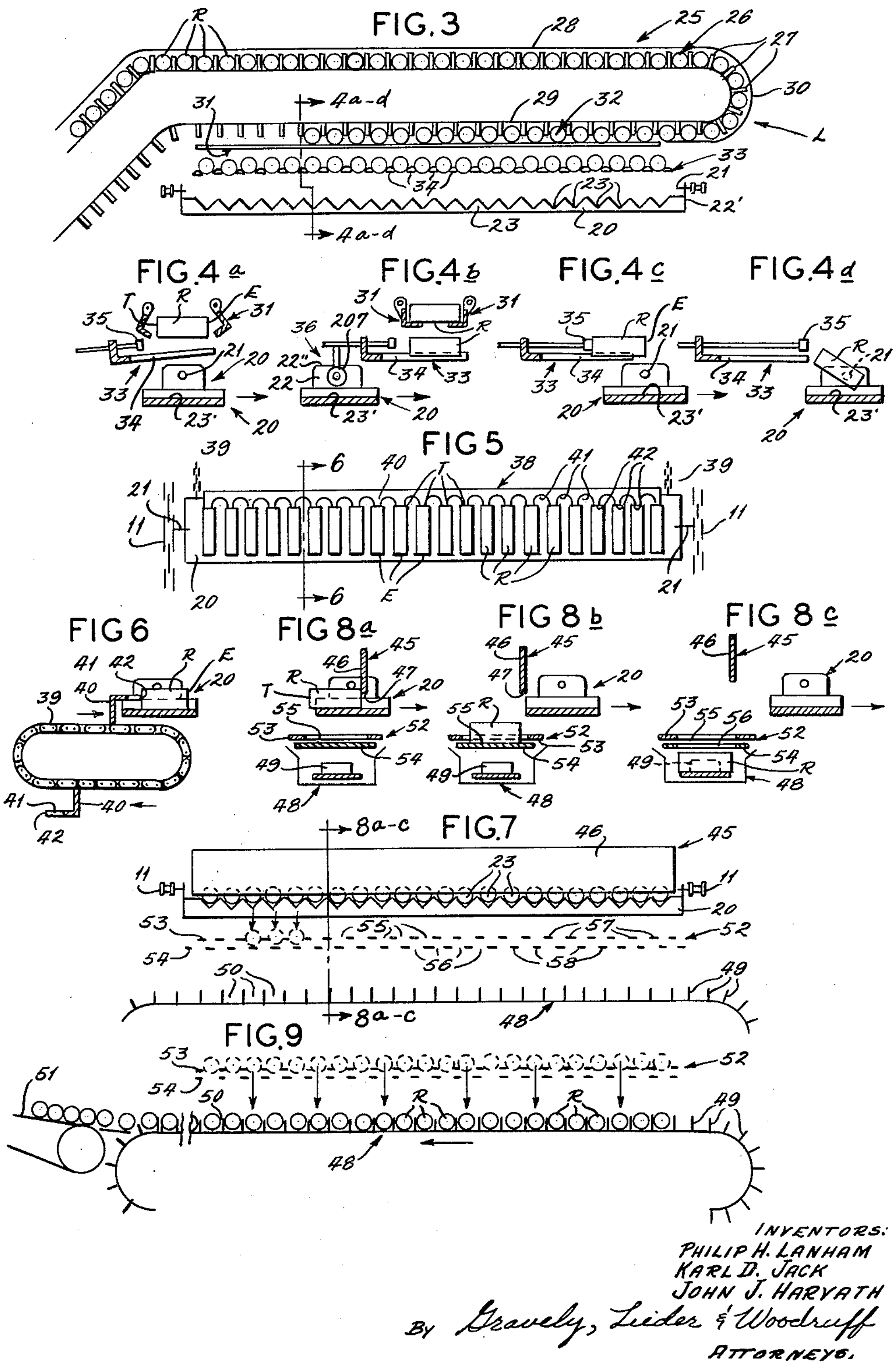
Figures 10, 11, 26, 27, 27A, 27B, 27C:
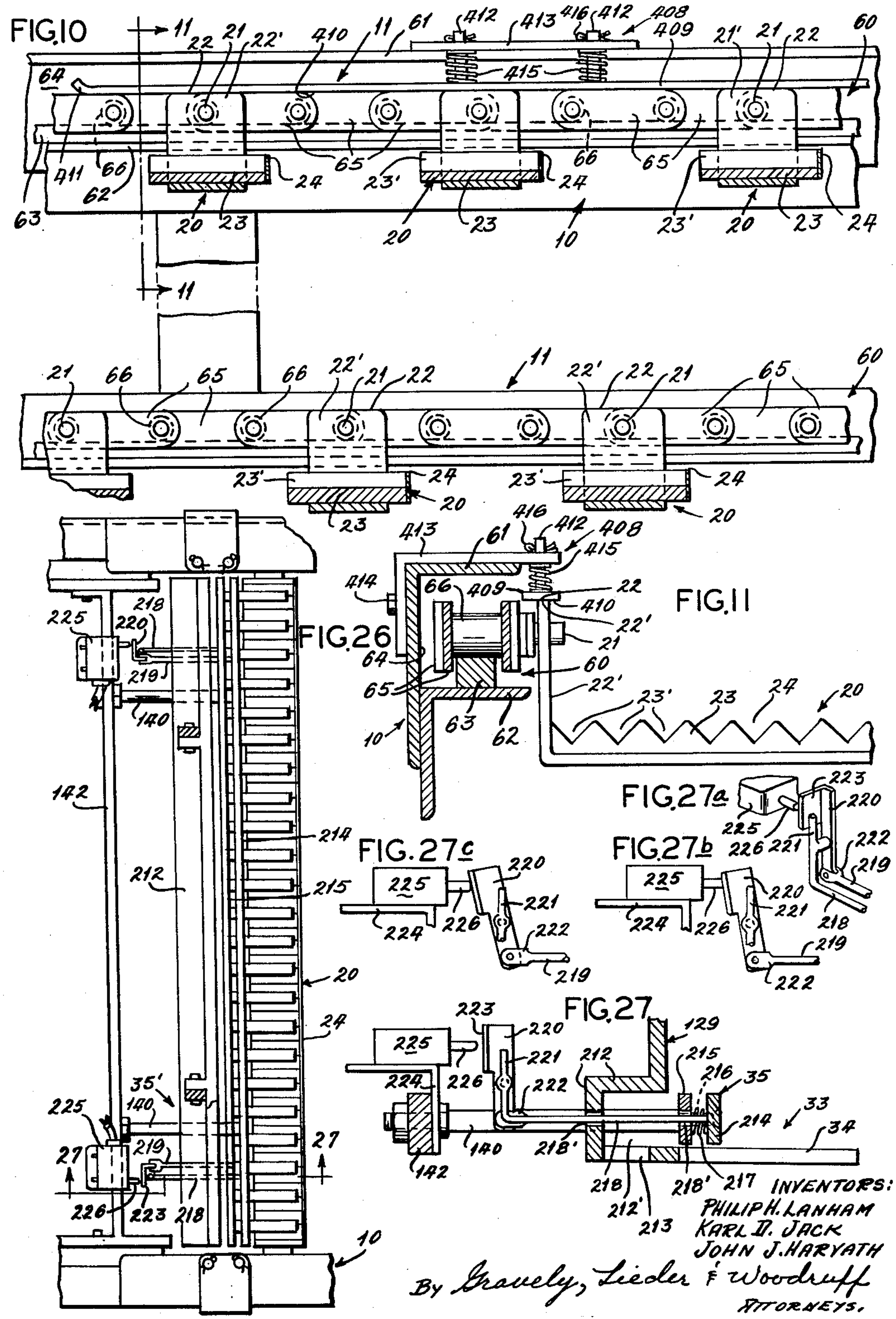
Figure 12:
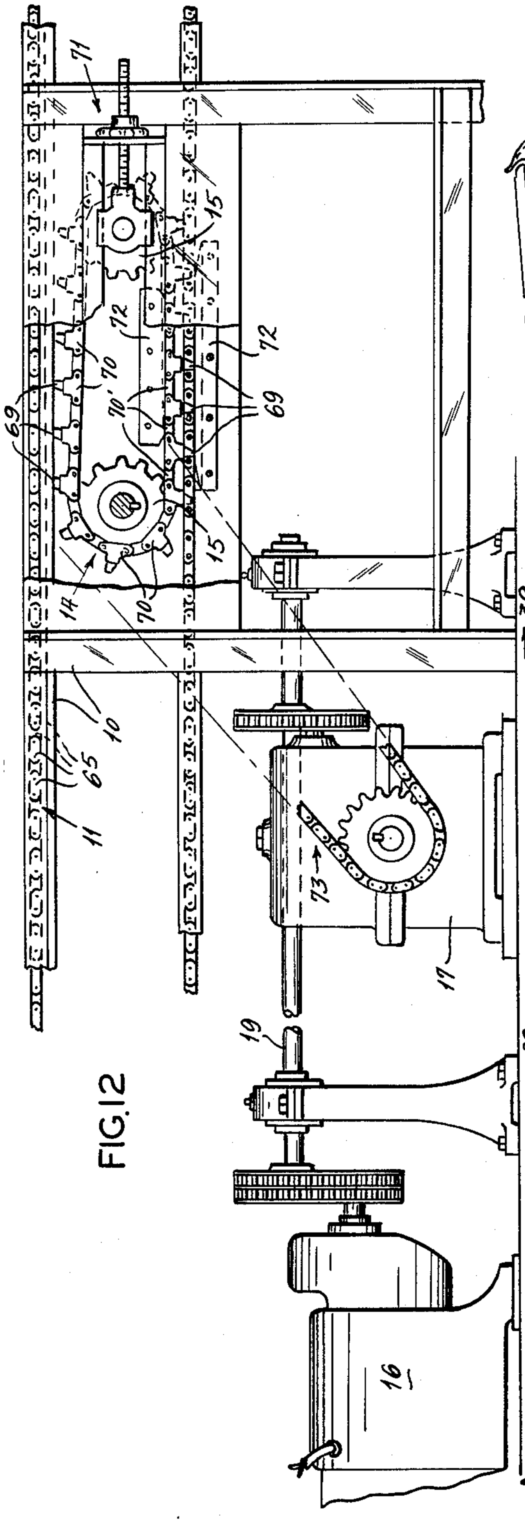
Figure 13:
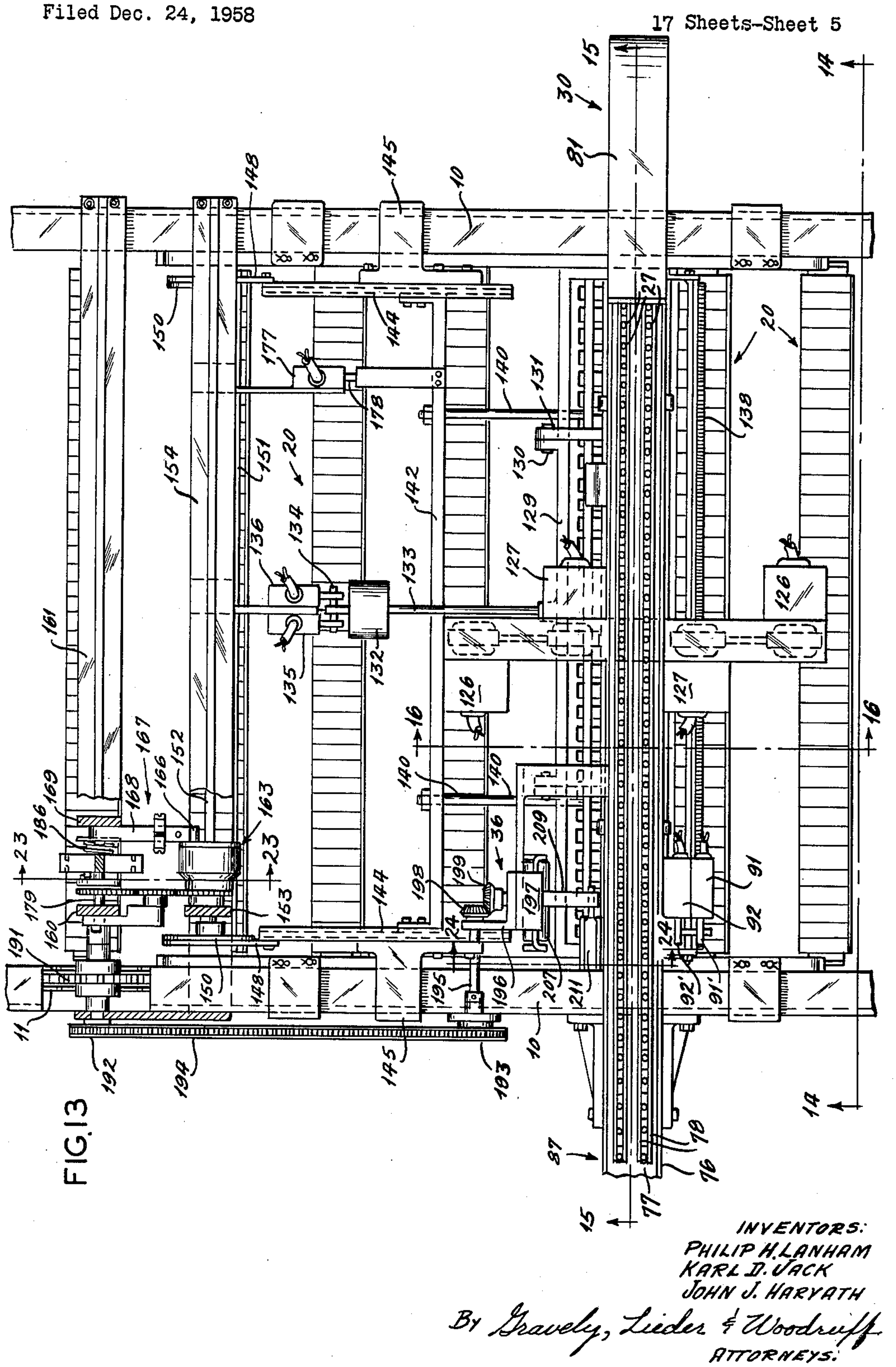
Figure 14:
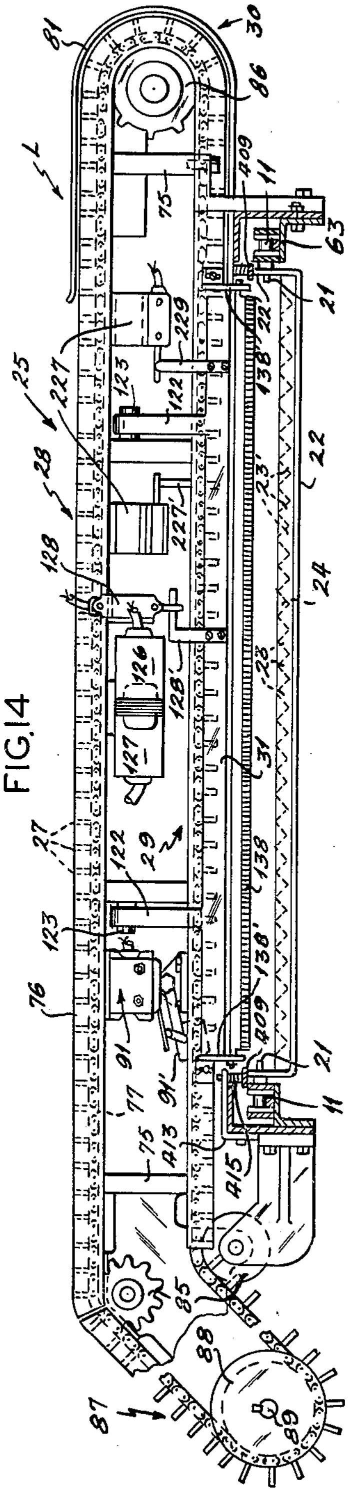
Figure 15:
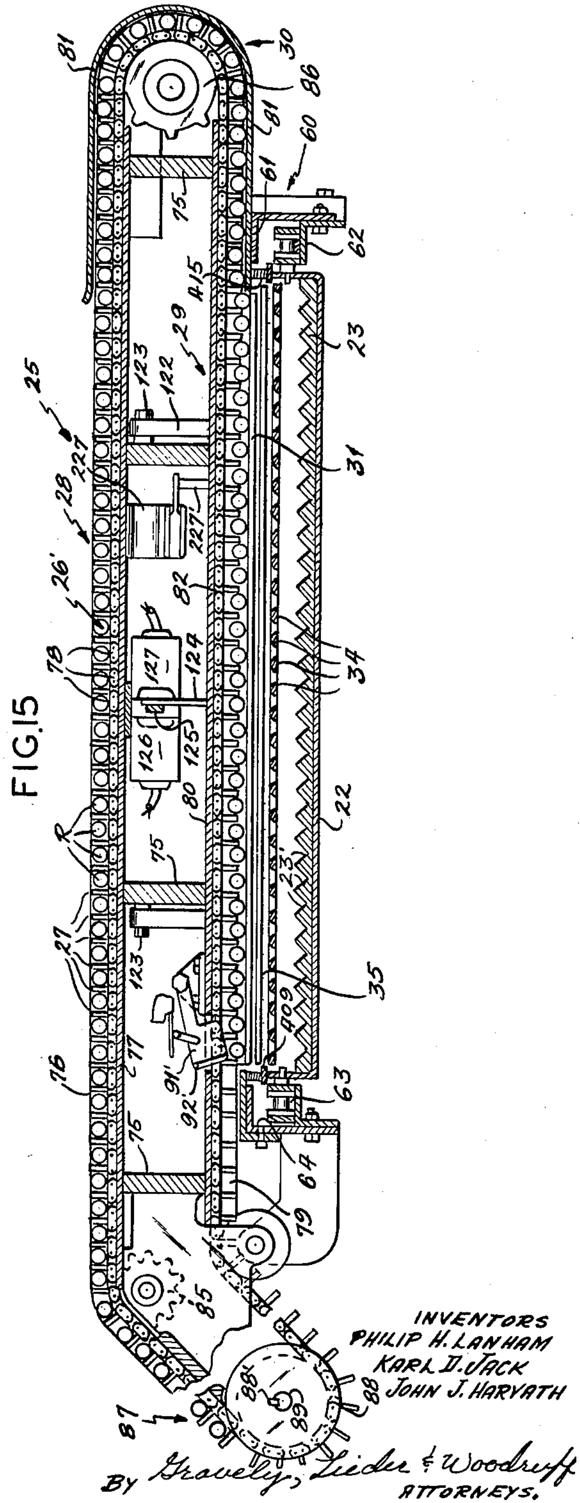
Figure 16:
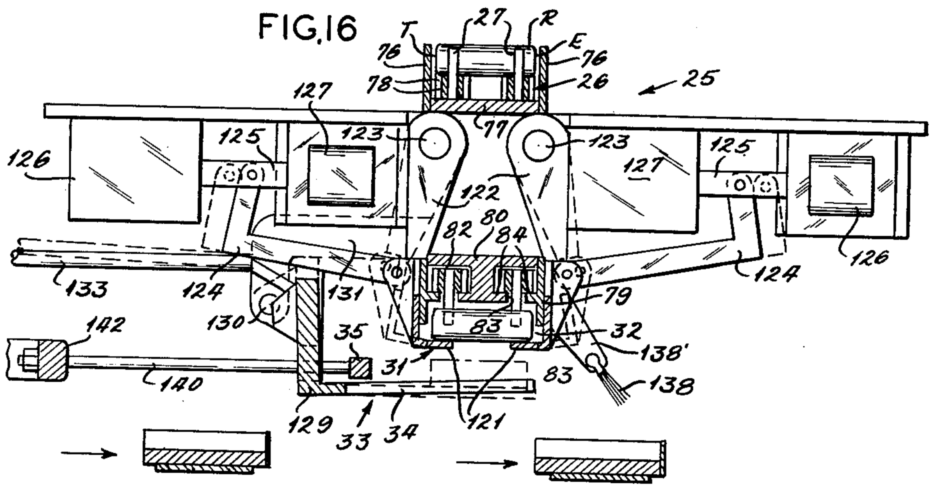
Figures 17, 23, 24:
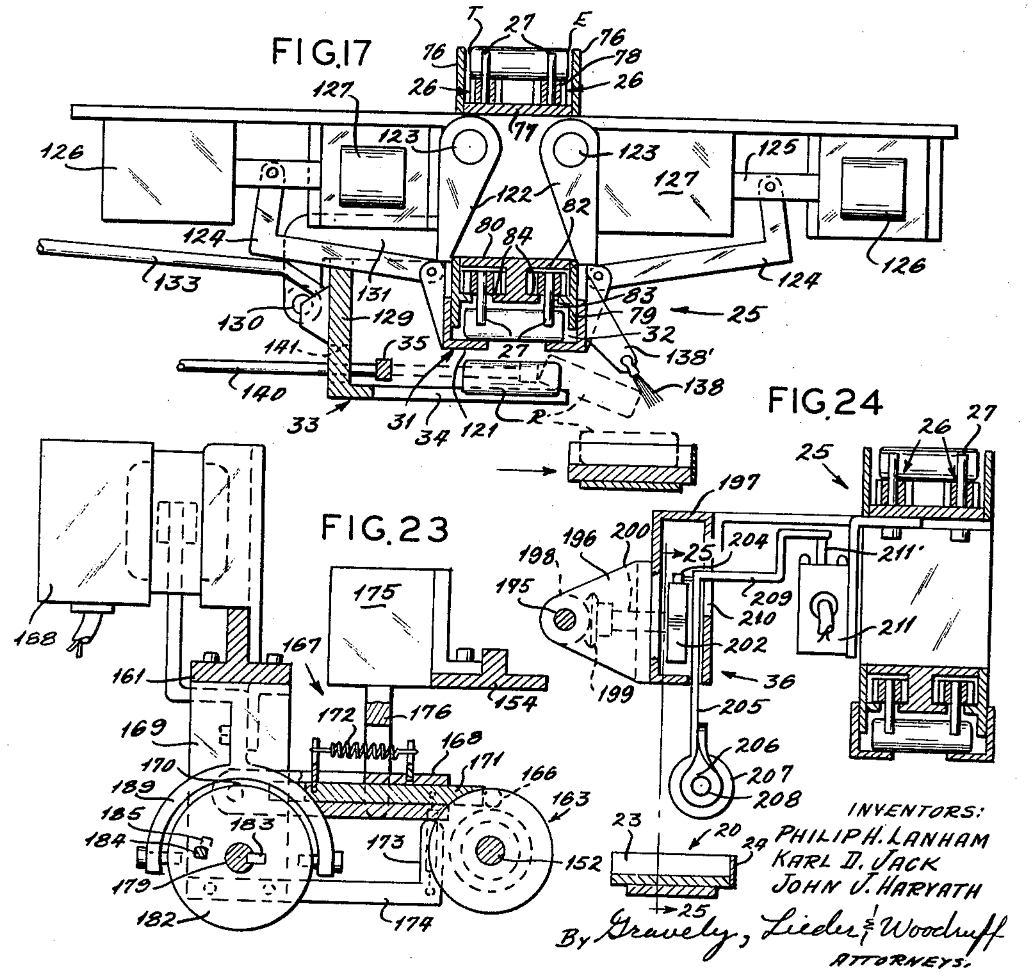
Figures 18, 19, 20:
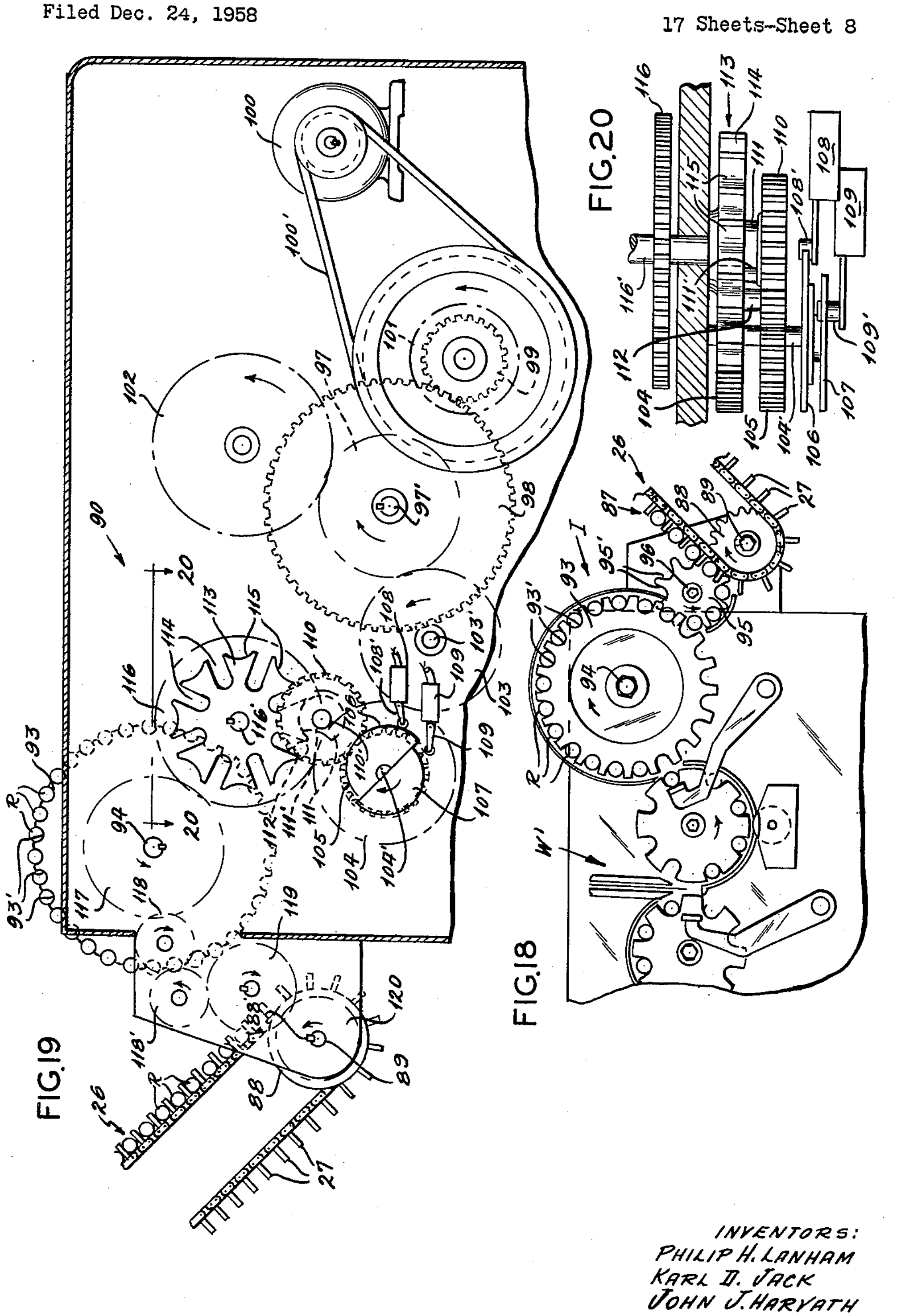

The present invention also consists in the parts and in the arrangements and combinations of parts hereinafter described and claimed. In the accompanying drawings which form a part of this specification and wherein like numerals refer to like parts wherever they occur:

FIG. 1 is a fragmentary top plan view diagrammatically showing a transfer and storage apparatus embodying the teachings of the present invention, FIG. 2 is a fragmentary vertical diagrammatic view taken substantially along the line 2—2 of FIG. 1, FIG. 2*a* is a fragmentary perspective view of a typical conveyor flight employed in the present apparatus, FIG. 3 is an enlarged transverse diagrammatic view of the loading device as taken along the line 3—3 of FIG. 1, and showing products in storage position prior to being deposited on an empty conveyor flight, FIG. 4*a* is a fragmentary vertical diagrammatic view of the loading apparatus taken along line 4*a–d*, 4*a–d* of FIG. 3 showing products being discharged to storage position, FIG. 4*b* is a view similar to FIG. 4*a*, but showing the products in storage position and sensing mechanism selecting an empty flight, FIG. 4*c* is another view similar to FIG. 4*a*, but showing the actuation of the ejector mechanism for moving the products from the storage position toward discharge position, FIG. 4*d* is a view similar to FIG. 4*a*, but showing the rolls being pushed onto the empty conveyor flight, FIG. 5 is a diagrammatic top plan view of a conveyor flight loaded with products and showing a mechanism for aligning the products on the flight, FIG. 6 is a diagrammatic cross-sectional view taken on the line 6—6 of FIG. 5, FIG. 7 is a transverse diagrammatic view of a discharge device taken substantially along the line 7—7 of FIG. 1, showing the products being moved from a conveyor flight to storage position, FIG. 8*a* is a fragmentary vertical diagrammatic view taken along the line 8*a–c*, 8*a–c* of FIG. 7 showing the products being engaged by stop means for discharging them from the conveyor flight, FIG. 8*b* is a view similar to FIG. 8*a*, but showing the products dropping from the flight to storage position, FIG. 8*c* is another view similar to FIG. 8*a*, but showing the products being discharged from storage position to a discharge conveyor, FIG. 9 is a transverse view similar to FIG. 7, but showing the products dropping from storage position to the discharge conveyor, FIG. 10 is an enlarged fragmentary elevational view of the main conveyor, FIG. 11 is a fragmentary cross-sectional view of the main conveyor taken substantially along line 11—11 of FIG. 10, FIG. 12 is an elevational view of the drive means for the main conveyor, FIG. 13 is an enlarged top plan view of the loading device, FIG. 14 is an enlarged vertical sectional view taken on the line 14—14 in FIG. 13, showing the loading device and a conveyor flight in elevation, FIG. 15 is an enlarged vertical sectional view taken on the line 15—15 of FIG. 13, showing the loading device and a conveyor flight in cross-section, FIG. 16 is an enlarged fragmentary vertical sectional view taken along the line 16—16 of FIG. 13 showing the loading device conveyor with the product supporting gates in closed position and, in broken lines, the gates in product dropping position, FIG. 17 is a view similar to FIG. 16 showing the products being pushed from the storage rack onto an empty conveyor flight, FIG. 18 is an elevational view of the transfer mechanism for transfering products from a first processing station to the loading device, this view being to the left of the loading device as shown in FIGS. 14 and 15.

Figure 22:
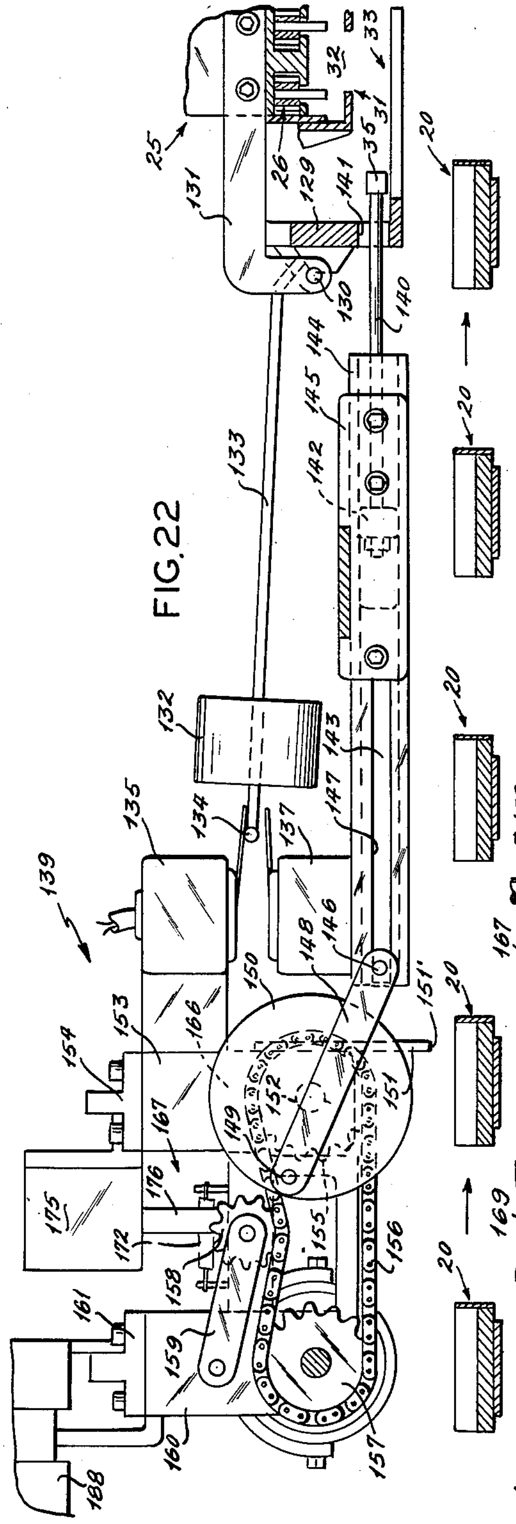
Figure 21:
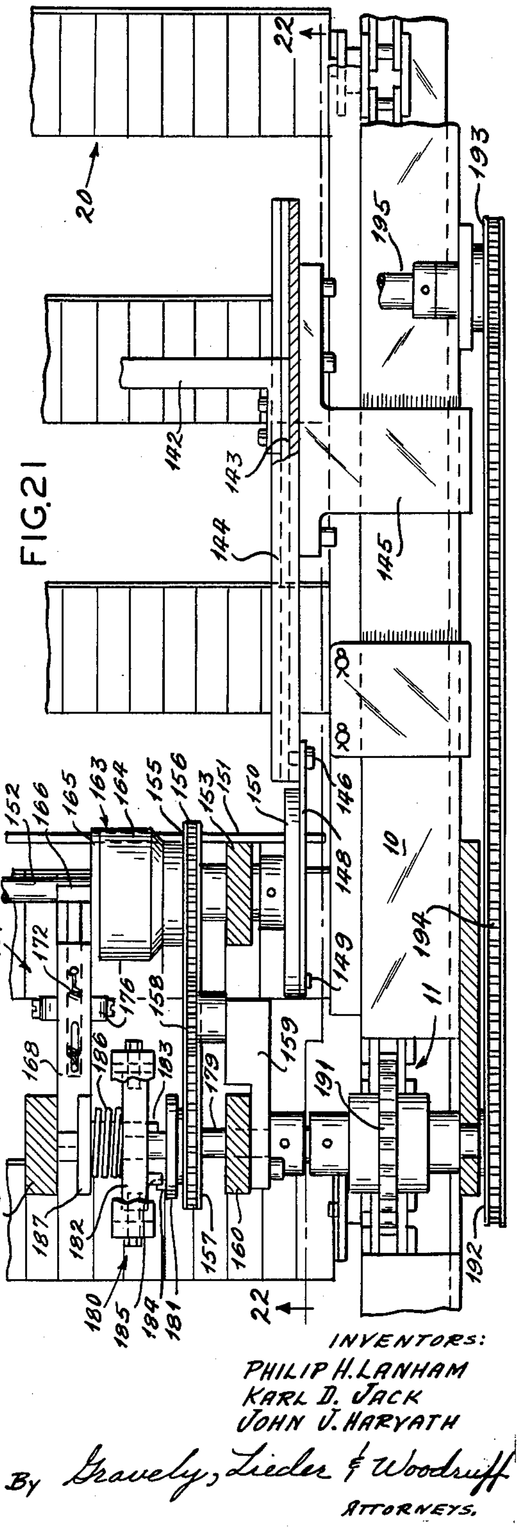
Figure 25:
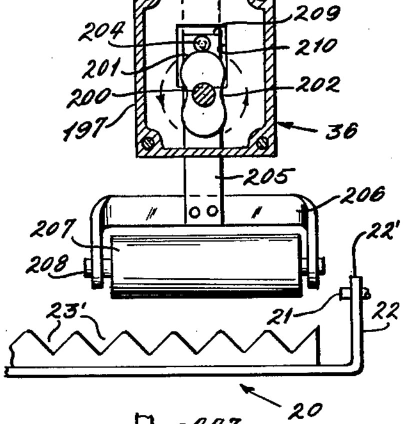

FIG. 19 is a vertical elevational view of the drive mechanism for actuating the transfer mechanism and the loading device conveyor as seen from the side opposite to the view in FIG. 18, FIG. 20 is an enlarged fragmentary top plan view of the drive mechanism for the transfer mechanism and loading device conveyor as taken substantially along line 20—20 of FIG. 19, FIG. 21 is a greatly enlarged top plan view of the mechanism for actuating the pusher bar for discharging the products from the storage rack to an empty conveyor flight as it passes below the loading device, FIG. 22 is a greatly enlarged vertical sectional view taken substantially along the line 22—22 of FIG. 21, showing the actuating mechanism for the pusher bar, the loading device and the empty flights passing beneath the loading device, FIG. 23 is an enlarged fragmentary vertical view taken substantially along the line 23—23 of FIG. 13 showing the clutch mechanism for engaging the pusher bar actuating mechanism, FIG. 24 is an enlarged fragmentary vertical sectional view taken substantially along the line 24—24 of FIG. 13 showing the sensing mechanism which is associated with the pusher bar mechanism for determining whether or not the conveyor flights are empty, FIG. 25 is a cross-sectional view of the sensing mechanism taken substantially along the line 25—25 of FIG. 24.

Figures 38, 39:
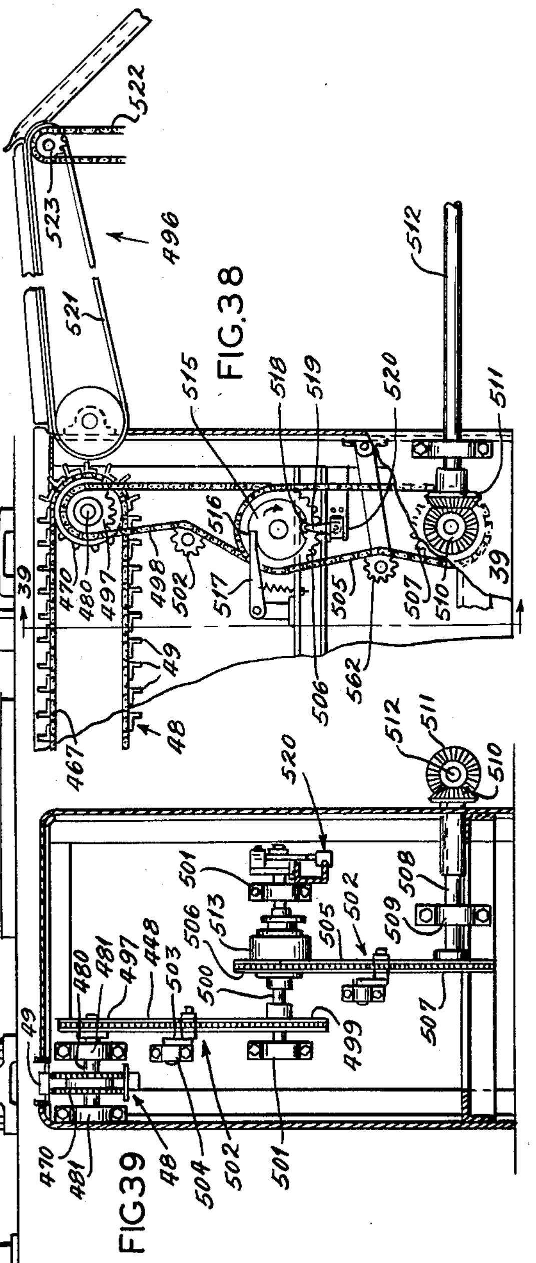
Figure 28A:
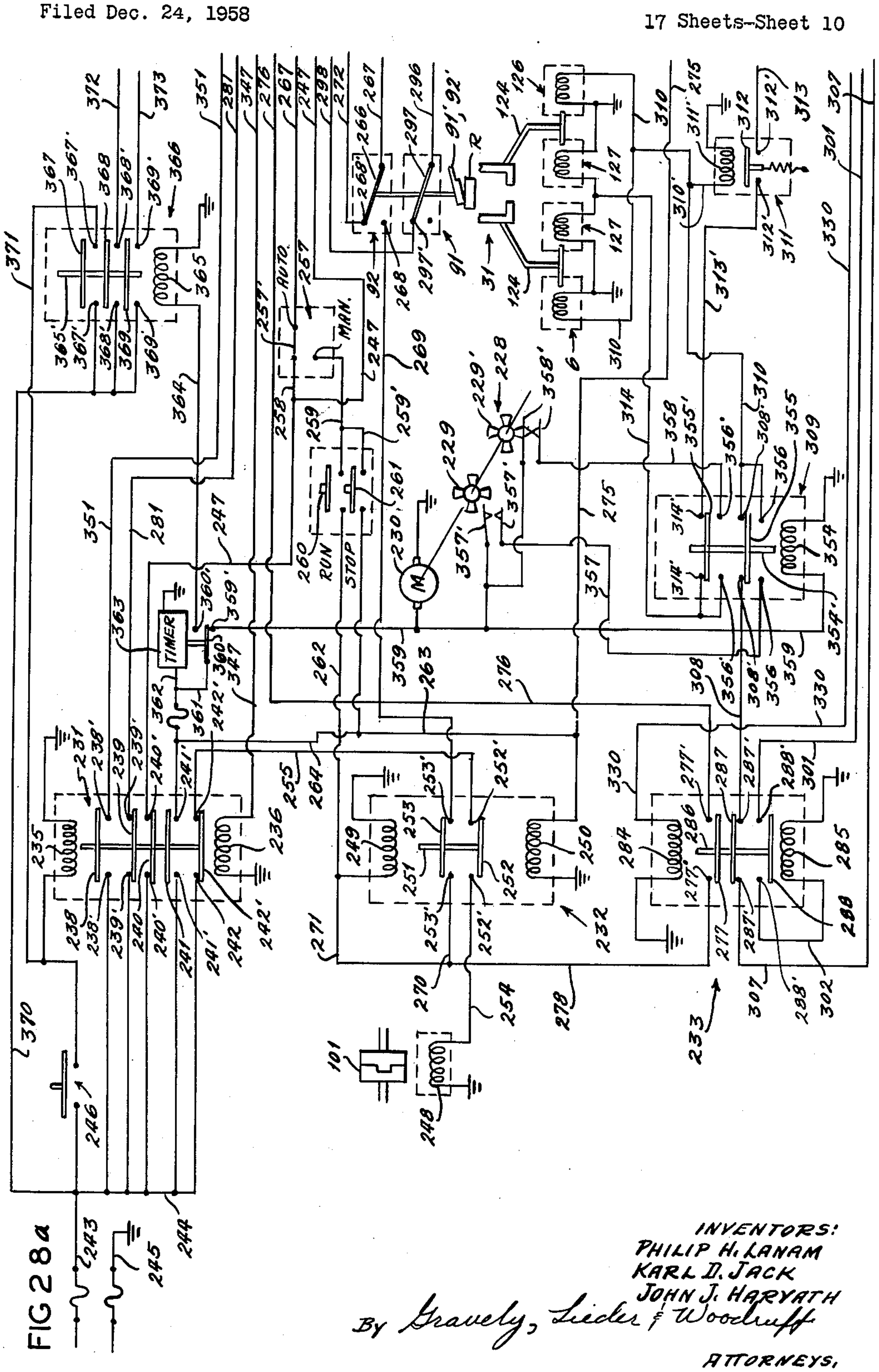
Figure 28B:
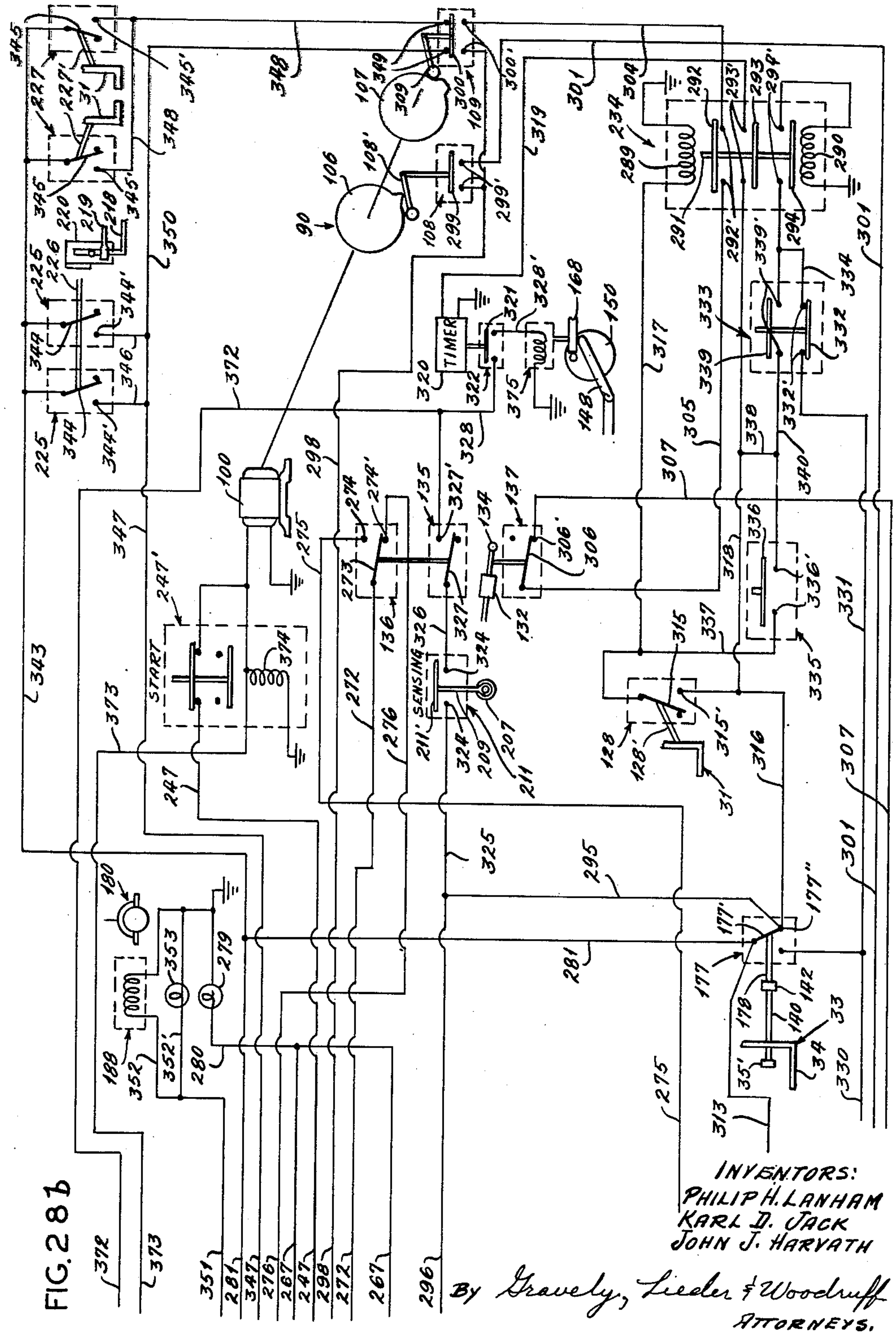
Figure 29:
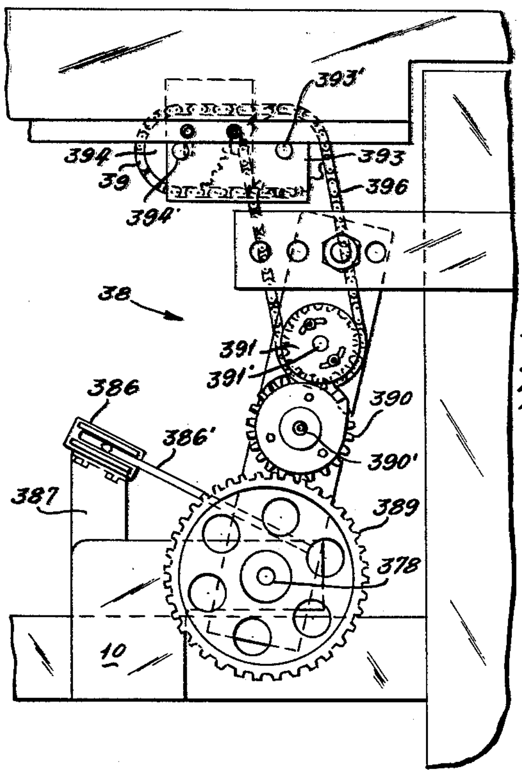
Figure 30:
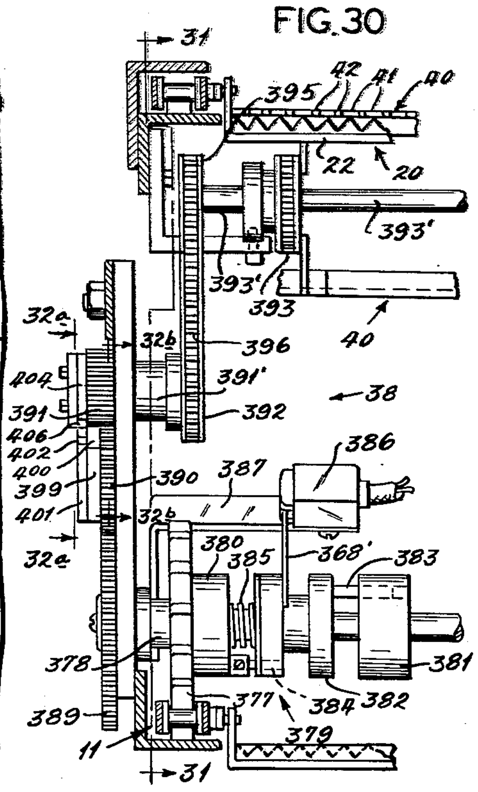
Figures 32A, 32B, 33A, 33B:
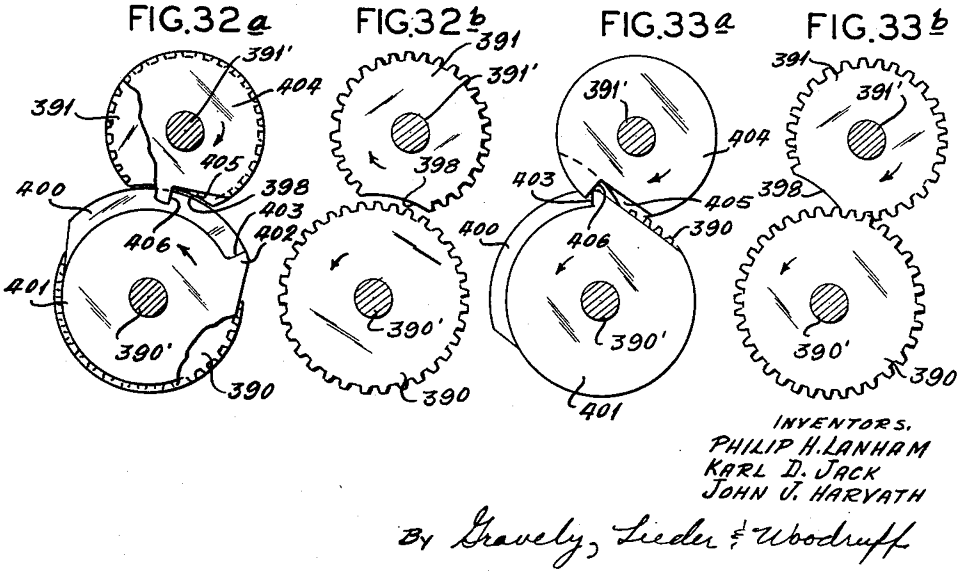
Figure 31:
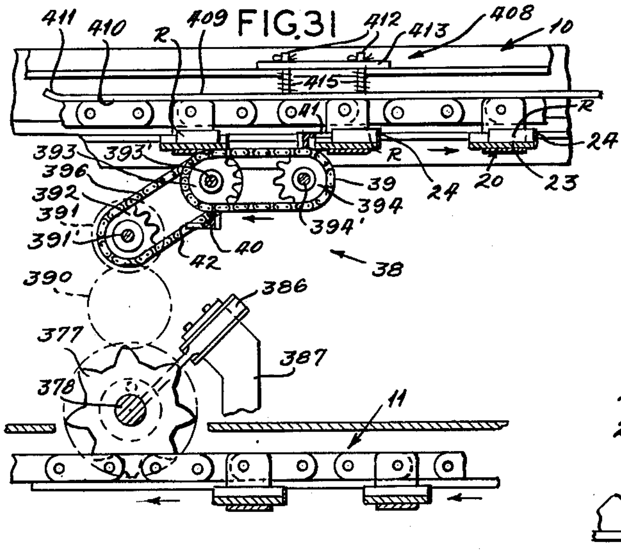
Figure 43:
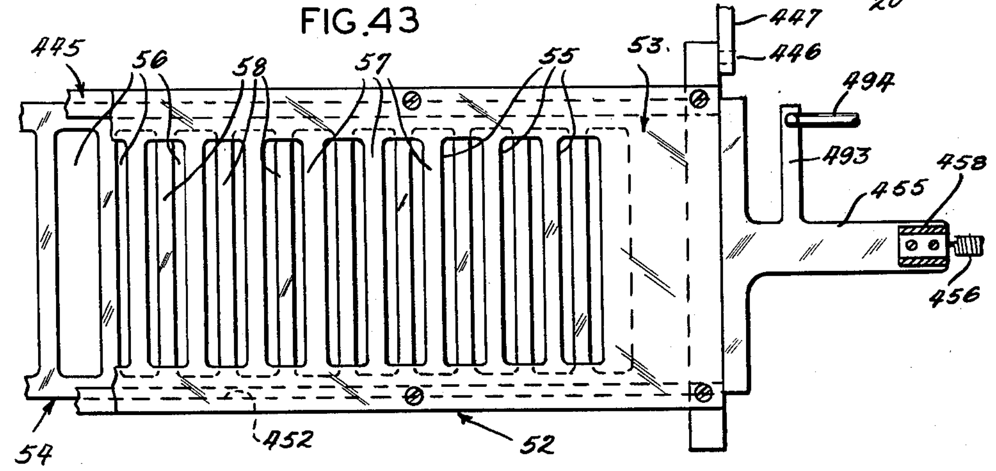
Figure 42:
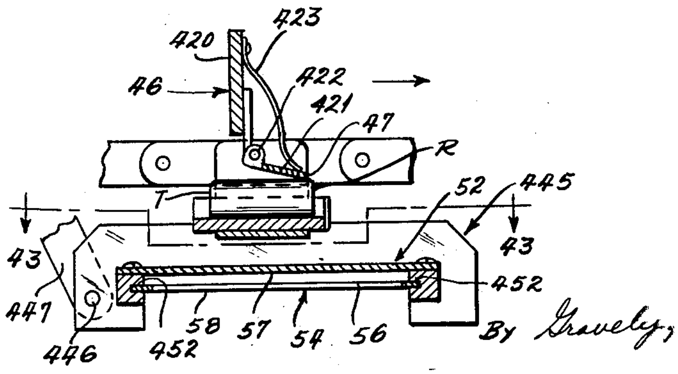
Figure 34:
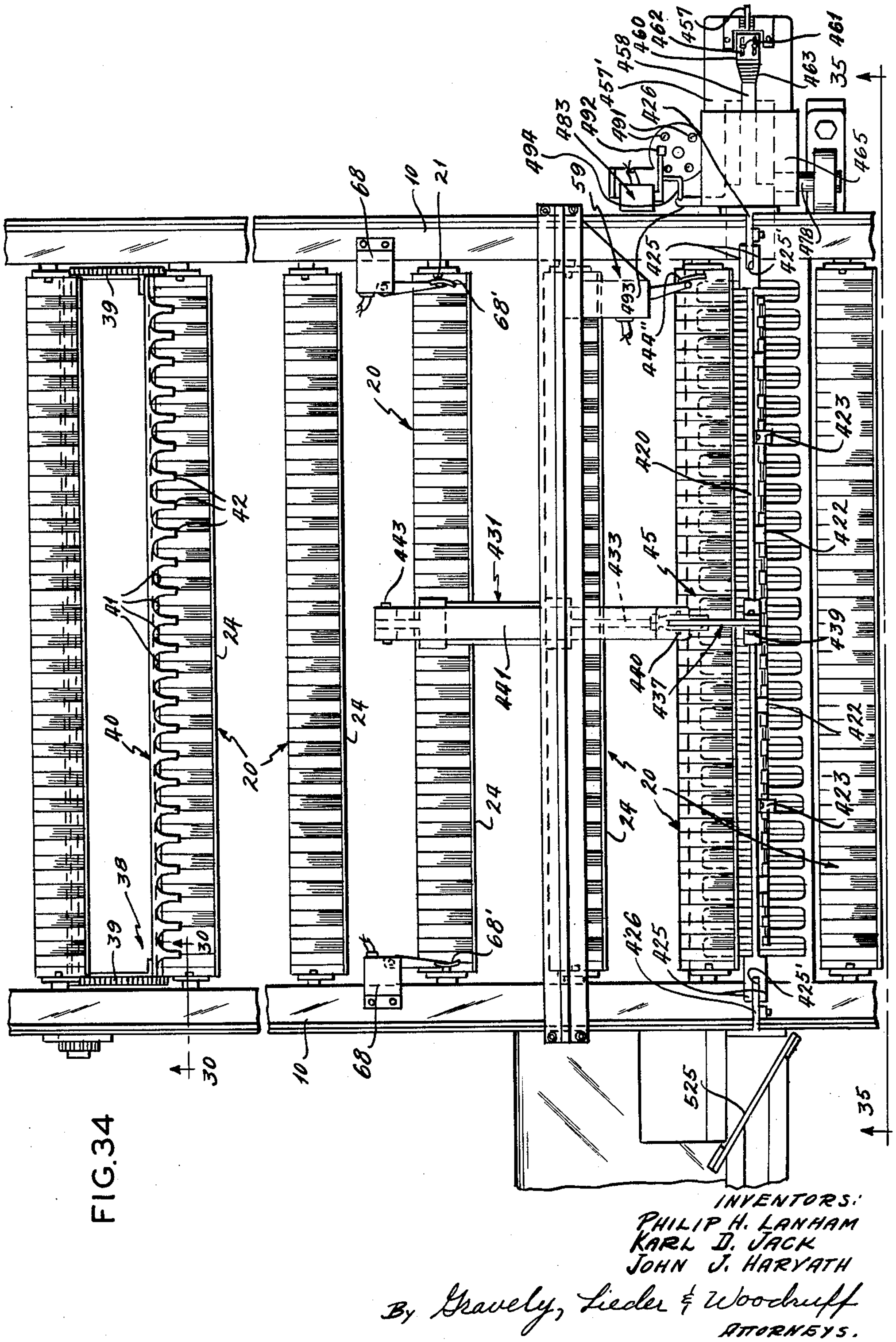
Figures 35, 36, 37:
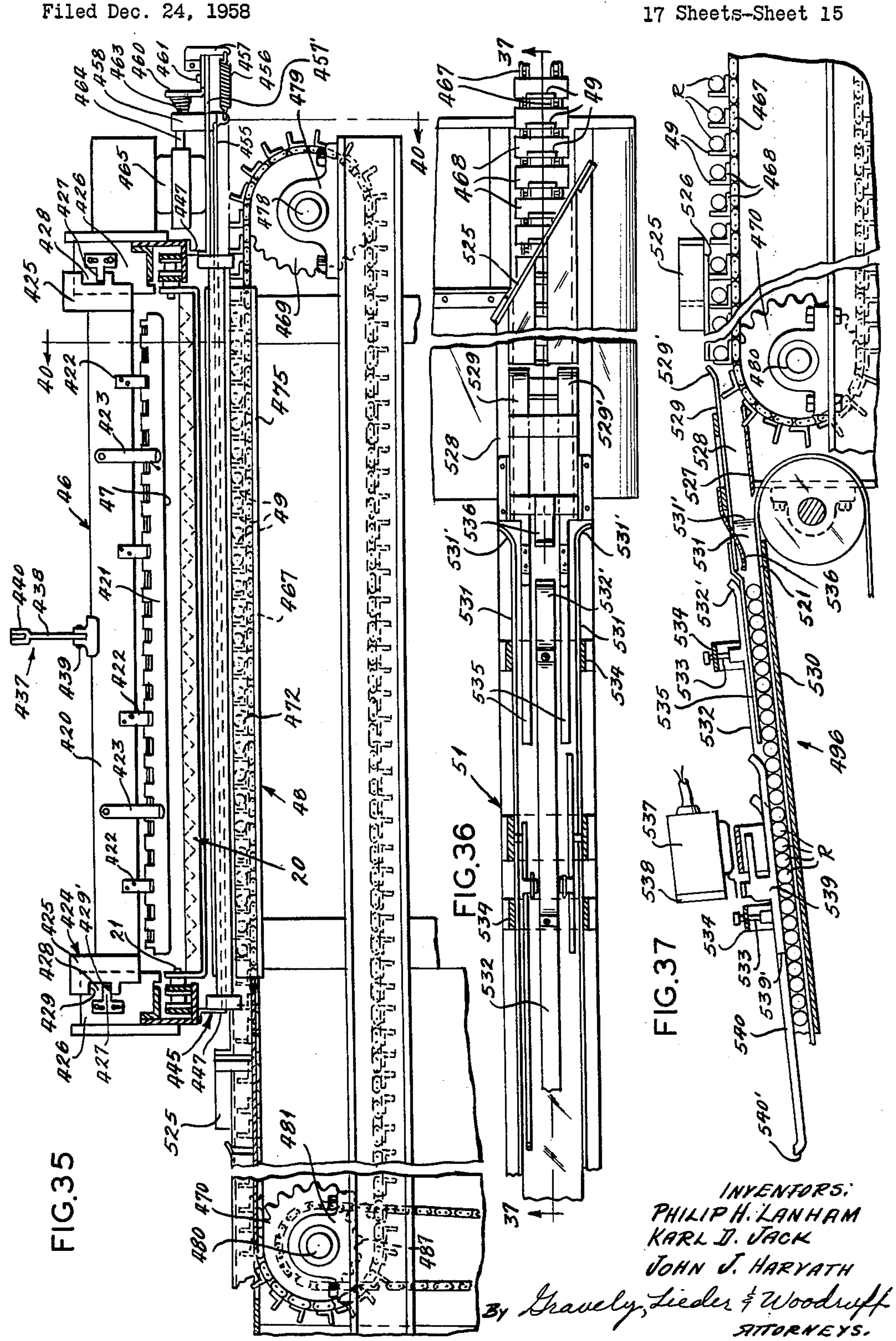
Figures 40, 41, 45:
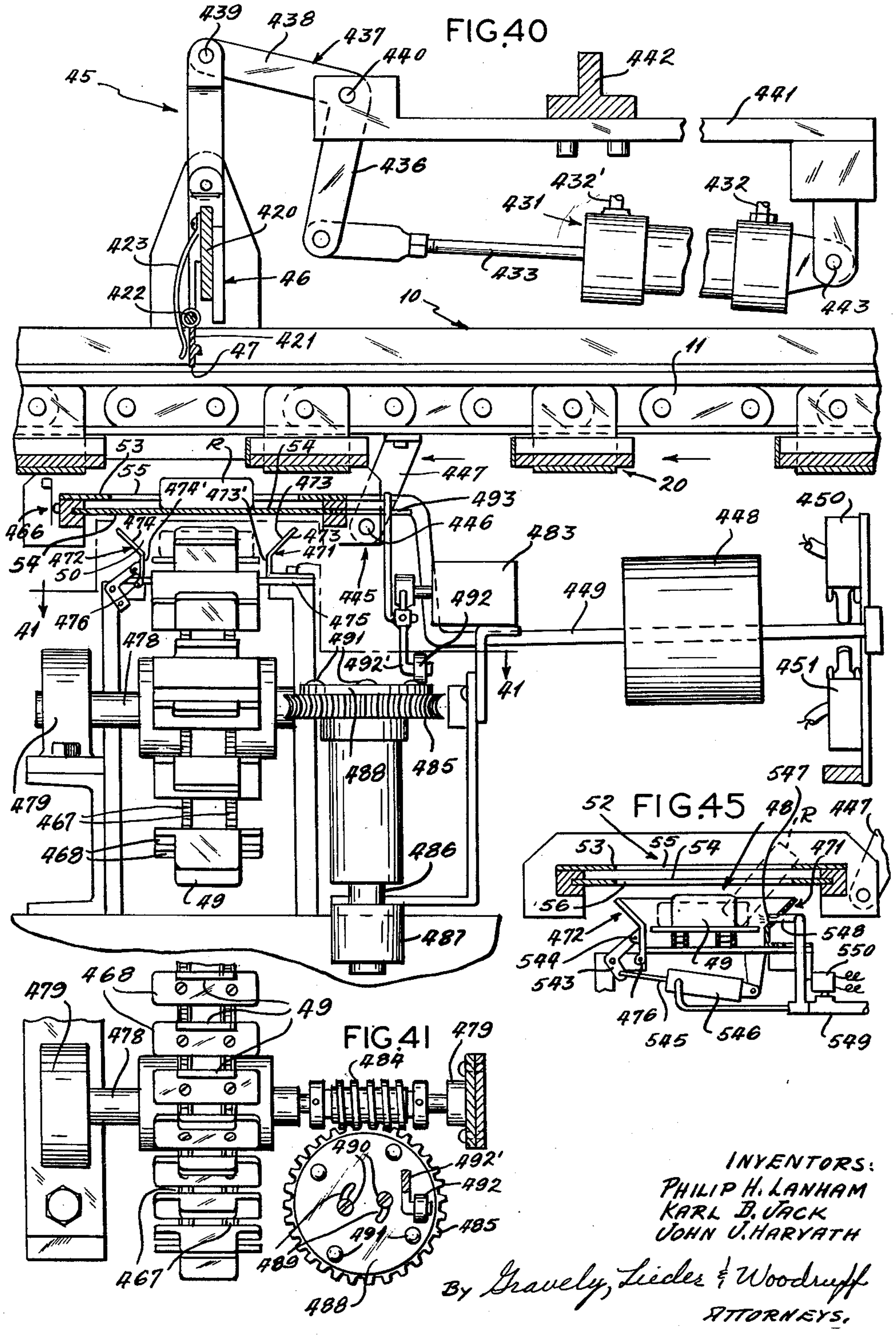
Figure 44:
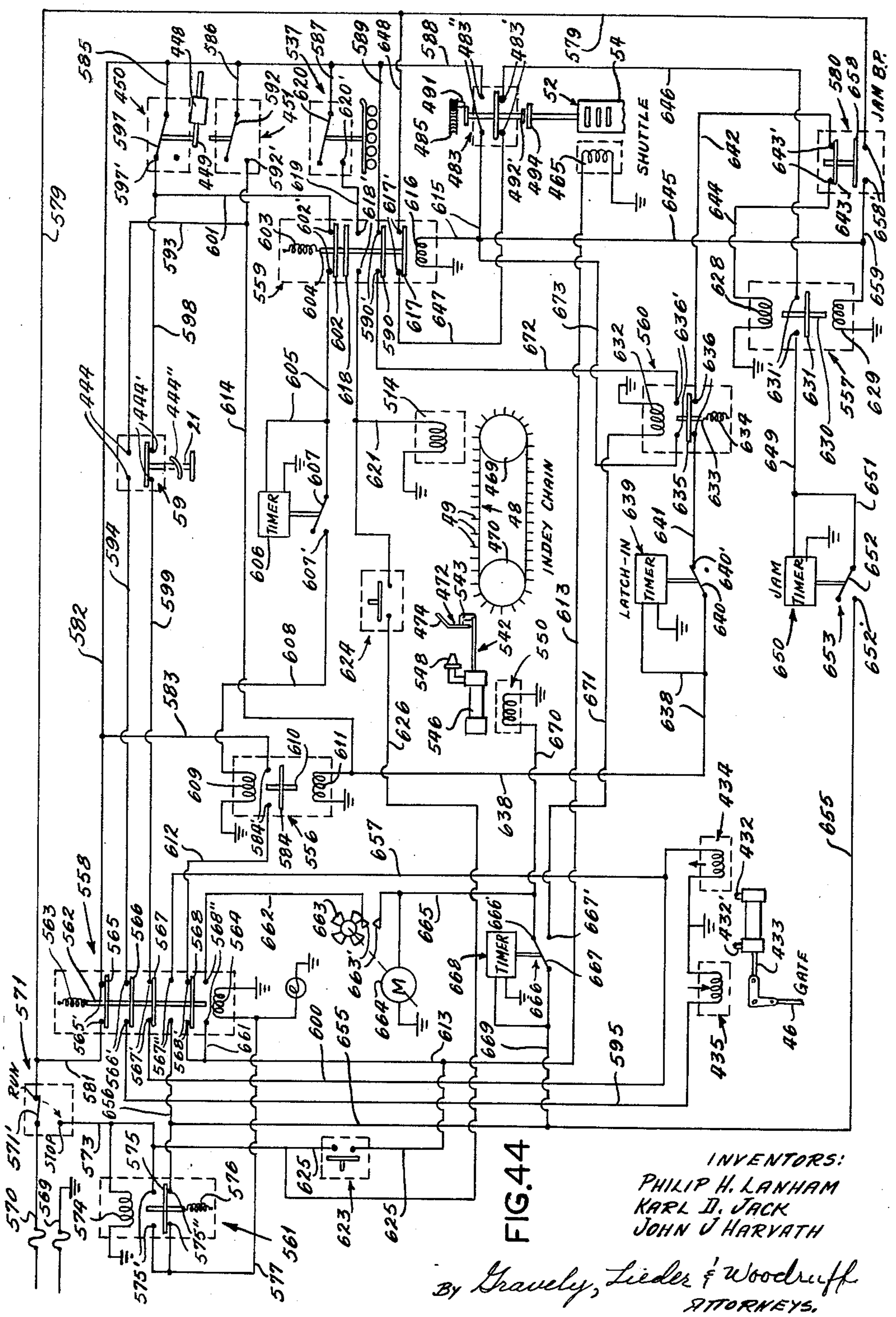

FIG. 26 is a top plan view of a modified pusher bar for the loading device,

FIG. 27 is a cross-sectional view of the pusher bar taken substantially along line 27—27 of FIG. 26, FIG. 27*a* is a perspective view of the jam switch contact member of the modified pusher bar assembly, FIG. 27*b* is an elevational view of the jam switch contact member shown closing the switch under one jam condition, FIG. 27*c* is a view similar to FIG. 27*b* but showing the switch being closed under another jam condition, FIG. 28*a* is the left-hand portion of a schematic view of the electrical circuits for operating the loading device, FIG. 28*b* is the right-hand portion of the schematic view of the electrical circuits, FIGS. 28*a* and 28*b* having a common match-line, FIG. 29 is a vertical side elevational view of the drive mechanism for aligning products carried by the master conveyor, FIG. 30 is an end elevational view, partly in section, of the product aligner drive mechanism as taken along line 30—30 of FIG. 34, FIG. 31 is a vertical elevational view of the product aligner mechanism as taken substantially along line 31—31 of FIG. 30, FIG. 32*a* is a greatly enlarged elevational view, partly broken away, of segmented gear and cam means for providing intermittent motion to the product aligner mechanism as taken along line **32*a*—32*a*** of FIG. 30, FIG. 32*b* is a view similar to FIG. 32*a*, showing the gear portion of the drive mechanism during the dwell period, as taken along line **32*b*—32*b*** of FIG. 30, FIG. 33*a* is a view similar to FIG. 32*a*, but showing the cam moving the gears into mesh after a dwell period, FIG. 33*b* is a view similar to FIG. 32*b*, but showing the gears in mesh after a dwell period, FIG. 34 is an enlarged fragmentary top plan view of the master conveyor showing the product aligner mechanism and a discharge device, FIG. 35 is an enlarged vertical elevational view, partly in section, taken substantially along line 35—35 of FIG. 34 showing the unloading or discharge device, FIG. 36 is an enlarged fragmentary vertical view of the transfer mechanism from the discharge device positioned to the left of FIG. 35, FIG. 37 is an enlarged fragmentary vertical view of the transfer mechanism from the discharge device shown in FIG. 36 as taken along line 37—37 therein, FIG. 38 is a vertical elevational view of the drive mechanism for operating the discharge device conveyor means, FIG. 39 is an elevational view, partly in section, of the drive mechanism as taken substantially along line 39—39 of FIG. 38, FIG. 40 is a greatly enlarged vertical sectional view of the discharge device taken along line 40—40 of FIG. 35 showing the stop mechanism in product by-passing position, FIG. 41 is a fragmentary top plan view of a switch mechanism for the discharge device as taken along line 41—41 of FIG. 40, FIG. 42 is a vertical sectional view showing the stop mechanism of the discharge device in jammed condition, FIG. 43 is a top plan view of the storage rack mechanism of the discharge device in product storing condition as taken along line 43—43 of FIG. 42, FIG. 44 is a schematic view of the electrical circuits for operating the discharge device, and FIG. 45 is a greatly enlarged fragmentary view showing jam clearing means for the discharge device.

For the purpose of disclosure and not by way of limitation, the transfer and storage apparatus will be described as if constructed specifically for transferring cylindrical rolls of tablets R having leading ends E and trailing ends T from a label or roll wrapping machine W to a packaging machine P. However, the present apparatus may easily be adapted for handling nearly any size or shape of consumer product, and for transferring such products between other types of processing stations in the manufacture of the product.

The transfer and storage apparatus is adapted to handle the rolls of tablets or rolls R in a completely automatic operation and includes a longitudinal conveyor C which forms a master storage means, a loading device L and a discharge or unloading device D. The transfer and storage apparatus has a master switchboard or control panel S from which each of the individual devices or the entire apparatus may be controlled and, in addition, individual automatic operating means for controlling each of the devices is provided.

Referring now particularly to FIGS. 1–9 of the drawings, a brief description of the apparatus and the operation thereof will now be given whereby the detailed description will be more easily understood. It will be seen that the longitudinal master conveyor C is mounted on suitable supporting means such as a main conveyor frame 10 and includes spaced chains 11 or the like positioned at the sides of the frame 10 and extending around suitable sprocket wheels 12 journaled on shafts 13 at the ends of the frame 10. The chains 11 are driven by a suitable means such as a drive chain 14 carried by spaced sprocket wheels 15 coupled to a variable speed motor 16 through a suitable speed reduction means 17. A suitable clutch 18 may be positioned on the drive shaft 19 from the motor to the speed reduction means 17 whereby the movement of the conveyor C may be stopped. The chains 11 are driven continuously in the direction of the arrows in FIG. 2 by the motor 16 so that the conveyor C moves in a closed path around the end wheels 12. In its path of movement, the conveyor includes an upper horizontal path in which rolls R are received from the loading device L and carried to the discharge device D or rightwardly in FIG. 2. The conveyor also has a lower horizontal path of movement.

The conveyor C also comprises a plurality of flights or carriers 20 freely pivotally mounted on trunnions or pins 21 secured to the chains 11 and extending perpendicular thereto or transversely of the longitudinal movement of the conveyor C, FIG. 2*a*. The flights 20 are in predetermined spaced relation with each other, and are positioned around the entire conveyor length. Each of the flights 20 includes a metal strap 22 or the like having vertical end members 22′ with horizontal upper margins 22″, the trunnions 21 extending through the end members 22′. A carrier board 23 having a serrated or grooved upper roll receiving surface 23′ is provided for carrying a plurality of rolls R in spaced relationship thereon, the surface 23′ being covered by a suitable material to resist movement of the rolls thereon. The leading edge of each conveyor flight is provided with a vertical abutment plate 24 forming stop means to assist in retaining the rolls R on the conveyor flight 20.

As the conveyor C moves in a closed path, each of the flights will constantly be carried with the serrated upper surface 23′ in upward roll carrying position in the upper and lower horizontal paths and around the end wheels 12 by reason of the free swinging mounting of the end members 22′ on the trunnions 21 so that the flights 20 can freely turn relative to the chains 11, FIG. 2. The flights 20 are moved past the loading device L to receive a row or bank of rolls thereacross, and carry the rolls R horizontally to the discharge device D which selectively unloads an entire bank of rolls from one of the flights. Under ideal operating conditions, all of the flights are filled with rolls between the loading and discharge devices, although some of the flights obviously will be emptied by the discharge device. Therefore, the loading device L fills the empty flights as they pass, and it is apparent that a plurality of loading devices may be required in order to fill all of the empty flights. However, this requirement is not critical except under conditions that will appear hereinafter, and the discharge device D may continue to function even though some of the flights 20 are empty.

Referring now to FIGS. 1, 3 and 4*a–d*, the loading device L is adapted to carry rolls of tablets from the wrapping machine or station W and to deposit them in groups or banks on the conveyor flights 20. Briefly, the loading device L comprises a conveyor 25 which extends past the wrapping machine W and receives rolls R thereon in spaced relation. The conveyor 25 of the loading device L extends over or "bridges" the conveyor C, and this conveyor will hereinafter be referred to as a bridge unit 25 for purposes of disclosure. The bridge unit 25 is transverse of the conveyor C or substantially parallel with the conveyor flights 20, and has upper and lower horizontal portions 28 and 29 extending across the conveyor C, the horizontal portions being connected by an arcuate portion 30. Chain means 26 having spaced pins 27 carry the rolls R over the bridge unit 25. A pair of normally closed opposed gates 31 are positioned under the lower portion 29 of the bridge unit 25 and define the bottom wall of a longitudinal chamber or chute 32 in which the rolls R are retained by the gates 31 to prevent them from dropping by gravity away from the chain 26 of the bridge unit. The length of the gates 31 is predetermined to permit the discharge of only a maximum number of rolls from the chamber 32. This number of rolls R will usually be the same as the number of rolls that may be carried by a single conveyor flight 20, but a smaller number of rolls may be discharged under certain conditions. Positioned directly beneath the chamber 32, is a primary chamber in the form of a storage rack 33 on which a bank of rolls R may be retained in position to be discharged onto an empty conveyor flight 20. The storage rack 33 comprises a plurality of transversely spaced longitudinal tines or fingers 34 adapted to receive the bank of rolls R from the chamber 32 and maintain them in spaced relation. A pusher bar 35 is reciprocably mounted for movement toward the rolls R on the rack whereby the rolls are pushed off the rack and onto an empty conveyor flight 20 positioned below and just ahead of the rack, FIG. 4*d*. Sensing mechanism 36, FIG. 4*b*, is provided for assuring that the rolls R are loaded onto an empty flight 20, and control means are provided for assuring that rolls are discharged from the chamber 32 to the storage rack 33 only when the rack is empty and the pusher bar 35 has been retracted to inoperative position. The movement of the chain means 26 in the chamber 32 to carry rolls thereto is intermittent, and the opening of the gates 31 is phased or timed with this movement so that rolls will be dropped only during the dwell time of the chain means 26.

As shown in FIGS. 5 and 6, roll aligning mechanism 38 is provided to assure that the trailing ends T of the rolls R are positioned on the conveyor flights 20 during movement toward the discharge device D. Briefly, this mechanism 38 comprises a closed path chain 39 at each side of the conveyor C, one of the chains 39 being geared to one conveyor chain 11 for intermittent movement at a speed greater than the speed of the conveyor. A pair of angle contact members 40 extend transversely of the conveyor C and are secured in spaced relation on the chains 39. The members 40 are adapted to be alternately moved into roll aligning position with successive flights 20 and, in this position, the member 40 in the upper horizontal path of the chains 39 extends above the upper surface 23' of the flight 20. The leading edges of the members 40 are fluted or cut-away as at 41 to form spaced contact surfaces 42 aligned with the grooves 23' of the flights 20. In operation, the contact surfaces 42 are moved into contact with the trailing ends T of the rolls R at a slightly advanced speed relative to the speed of the conveyor C so that the rolls R are contacted or tapped gently and moved forwardly relative to the flights 20 without causing breakage or other damage to the rolls.

Referring now to FIGS. 7–9, the unloading or discharge device D is adapted to transfer rolls of tablets from the conveyor flights 20 to the packaging machine or station P. Briefly, the discharge device D comprises a stop mechanism 45 including an abutment member 46 adapted to be moved vertically between roll stopping position and roll by-passing position. In roll stopping position, FIG. 8*a*, the abutment member 46 is lowered so that the leading ends E of a bank of rolls R carried by a conveyor flight 20 will contact the member 46, but the lower margin 47 of the member is spaced above the upper surface 22 of the conveyor flight 20. Thus, the flight passes under the abutment member 46 and the rolls R are stopped and drop downwardly, FIG. 8*b*. Positioned in spaced relation below the roll stopping position of the stop mechanism 45 is a continuous conveyor 48 having upstanding partitions or lugs 49. The lug conveyor or index chain 48 forms a divided longitudinal chamber 50 adapted to receive a bank of rolls R therein, the index chain being actuated periodically to deliver the rolls to the packaging machine P through an unloading chute or transfer mechanism 51 which is provided with means for controlling the actuation of the index chain 48. A primary storage means in the form of a shuttle 52 is located intermediate to the roll discharge position of the stop mechanism 45 and the index chain 48, the shuttle 52 comprising a pair of superposed upper and lower plates 53 and 54 each of which has slots 55 and 56 spaced apart by grill members 57 and 58, respectively. The lower plate 54 is adapted to move relative to the upper plate 53 to align the slots 56 and 55, but in normal storage position the slots are offset so that a bank of rolls R may be received in the slots 55 of the upper plate 53 and rest on the grill members 58 of the lower plate 54. The fixed upper plate slots 55 are aligned vertically with the grooves 23' of the conveyor flights 20 and also with the spaces between the lugs 49 of the unloading conveyor 48 so that each of the rolls R of the bank may drop directly downwardly from the flights 20 to the primary storage 52 and from the primary storage 52 to the index chain 48 thereby remaining in spaced relationship. Sensing mechanism 59, FIG. 34, is provided for assuring that the stop mechanism abutment member 46 is only lowered intermediate the flights 20 and control means are also provided for assuring that rolls are only discharged from the flights 20 when the primary storage 52 is empty and the plates 53 and 54 are in closed roll supporting position. Means for moving lower plate 54 are provided as well as control means so that the rolls R in primary storage will be dropped to the index chain chamber 50 when the chain 48 is not moving. The index chain 48 is moved only in response to signals from the unloading chute 51 that more rolls are required by the packaging machine P.

A detailed description of the apparatus and the various devices and mechanisms will now be given for a more complete understanding of the present invention.

*Master Conveyor C*

The master conveyor C (FIGS. 1–2*a* and 10–12) comprises the main frame 10 having opposed sides with upper and lower longitudinal tracks or chain guides 60, each of which includes vertically spaced upper and lower horizontal flanges 61 and 62. A rail 63 is secured to the lower flange 62 in spaced relation with the track side wall 64. The chains 11 are moved in the chain guides 60 and around the end sprocket wheels 12, and each chain 11 includes a plurality of links 65 pivotally connected on roller-type pins 66. The chains 11 are H-shaped in cross-section and straddle the rails 63 with the pins 66 positioned on the upper surface thereof. The trunnions 21 may comprise extensions of spaced pins 66 or may be secured in predetermined spaced relation to the chains 11, the trunnions 21 on one chain being aligned transversely with the trunnions 21 on the other chain 11.

The flights 20 extend between the chains 11 and are pivotally mounted on the trunnions 21. During operation of the conveyor C, the flights 20 must remain parallel to each other and perpendicular to the chains 11. Any drag or other condition that affects the relationship of the flights 20 to each other and to the chains 11 will produce chattering or vibration of the flights whereby the rolls R may be thrown from the flights 20. Accordingly, adjustment means 67, FIG. 2, are provided for relative adjustment or rotation of the wheels 12 at one end of the conveyor C so that flight alignment may be maintained. A pair of switches 68, FIG. 34, are mounted on the main frame 10 in opposed relationship, the switches 68 having contact shoes 68' adapted to contact the trunnions 21 supporting each flight 20 during movement of the flights therepast. The shoes 68' are aligned with each other so that they will be simultaneously contacted when the flights 20 are parallel. The switches 68 are instantaneously closed to hold open an electrical circuit to a trouble light (not shown). Accordingly, in normal operation the trouble lamp will not be lighted. However, in the event one switch 68 is closed before its companion switch 68 by reason of the flights being angularly positioned relative to the chains 11, the trouble light will be lighted and it will be apparent that adjustment of the chains 11 is required to bring the flights into perpendicular relationship therewith.

Referring to FIG. 12, the chain 14 is a sprocket type chain having lugs or sprockets 69 formed on or secured to links 70 pivotally connected by links 70'. The chain 14 extends in a closed path around the sprocket wheels 15, one of which is adjustable by means 71 toward and away from the other wheel 15 for providing chain tension. The lower path of the chain 14 is adjacent to and parallel with the lower horizontal path of one of the master conveyor chain 11, and the lugs 69 project downwardly between the pins 66 of the chain 11. A pair of chain guides 72 are provided for maintaining the chain 14 in driving relationship with chain 11. The chain 14 is driven from the speed reduction means 17 through a suitable sprocket train 73 or the like.

The master conveyor C is also provided with a manually operated safety line 74, FIG. 2, for disengaging the clutch 18 between the motor 16 and the speed reduction means 17 whereby the power is removed from the conveyor chains 11. If the normal load is high enough, the conveyor will stop almost instantly. However, in smaller installations it may be desirable to provide a conventional combination clutch-brake assembly (not shown) to prevent the conveyor C from coasting. Also shown in FIG. 2 is a blower 74' for maintaining the flights 20 relatively free from dust or the like that may otherwise get into the operating parts of the apparatus.

As will be discussed more fully hereinafter, the conveyor C is driven by the variable speed motor 16 so that the movement of the loaded flights 20 between the loading device L and the discharge device D may be advanced to increase production.

*Loading Device L*

*Bridge unit.*—The loading device (FIGS. 1–4*d* and 13–17) includes the bridge unit 25, which is supported on suitable rigid frame members 75. The upper portion 28 of the bridge unit has opposed side plates 76 and a bottom plate 77 defining a channel in which the chain means 26 is moved. The chain means 26 comprises a pair of spaced chains each of which is formed of pivotally connected links 78 having the upstanding pins 27 secured in spaced relation thereto. The pins 27 of the chains 26 are aligned to form pairs of pins defining pockets or chambers between adjacent pairs for retaining and carrying the rolls of tablets R in spaced relation. As shown best in FIGS. 14 and 15, in the upper portion 28 of the bridge unit 25, the chains 26 move along the bottom plate 77 and the rolls R are retained in the pockets gravitationally. The lower portion 29 also has side plates 79 and a top member 80 defining a channel that is inverted relative to the upper portion channel. Accordingly, the arcuate portion 30 and lower portion 29 are provided with means for retaining the rolls between the pairs of pins 27. This retaining means for the arcuate portion 30 and a section of the lower portion 29 adjacent thereto comprises a fixed retainer plate 81, and the retaining means for the length of the lower portion 29 forming the chamber 32 from which a bank of rolls R are discharged to the storage rack 33 comprises the opposed gates 31. The top member 80, FIGS. 16 and 17, for the lower portion 29 is provided with a pair of T-shaped channels extending the length of the top member and including horizontal grooves 82 and vertical slots 83. The links 78 of the chains 26 are slidable on supporting tracks 84 of the horizontal grooves 82 and the pins 27 depend from the chains 26 through the slots 83. It is apparent that the top member 80 supports the chains and prevents them from sagging or otherwise affecting the smooth operation of the bridge unit 25. The chains 26 are also supported by suitable sprocket wheels 85 including a large sprocket wheel 86 for carrying the chains around the arcuate portion 30.

Referring again to FIGS. 14 and 15, the upper and lower portions 28 and 29 are connected to a feed portion 87 extending around a pair of drive sprocket wheels 88 adjacent to the roll wrapping machine W. The sprocket wheels 88 are keyed at 88' to a shaft 89 so that the pins 27 of the chains 26 are kept aligned at all times.

In the event it is desired not to discharge the rolls R onto the master conveyor C as when the wrapping machine W is applying a foreign language label to the rolls, the gates 31 may be kept closed by operation by-pass means in the electrical circuit for the loading device L so that the rolls R will be carried from the lower portion 29 back toward the drive wheels 88 and may be removed from the chains 26 at this point. It is, of course, understood that several wrapping machines W and loading devices L therefor may be associated with the master conveyor C including standby machines which in the event of down-time on one of the other machines may automatically be started into operation to meet production requirements, and one of these standby machines may be utilized for applying foreign labels without affecting normal production of the main conveyor C.

In operation, the chains 26 are driven past the wrapping machines W, up the feed portion 87, across the upper portion 28, around the arcuate portion 30 and back across the lower portion 29 to the feed portion 87 in a closed path by a loading device drive mechanism 90, FIGS. 18–20. The drive mechanism actuates the chains 26 intermittently to move them a predetermined distance and then provide a brief dwell time during which the chains and the rolls are at rest. The dwell time provides a period in which the ends T and E of the rolls R may be sealed by the wrapping machine W, and for the discharge of the bank of rolls from the chamber 32 through the gates 31 to the storage rack 33. A pair of switches 91 and 92, FIGS. 14, 15 and 28*a*, having actuating arms 91' and 92' are mounted on the bridge unit 25 at the delivery portion end of the lower portion 29. If the storage rack 33 is empty when the switches 91 and 92 are closed by a roll R being moved into contact with the arms 91' and 92', the gates 31 will be opened during the dwell time of the chains 26 to drop a bank of rolls R onto the empty storage rack 33. However, if the storage rack 33 is loaded with a bank of rolls, the loading device L and wrapping machine W will stop operation until the bank of rolls on the storage rack 33 is discharged onto a conveyor flight 20, and the bank of rolls above the gates 31 will then be dropped onto the empty storage rack 33 and the wrapping machine W and loading device L will again be operative. The function of the switches 91 and 92 will be described more fully hereinafter in connection with the electrical circuit for the loading device L, as will the by-pass means for preventing the discharge or rolls R through the gates 31.

*Transfer mechanism.*—As shown best in FIG. 18, a transfer or indexing mechanism, shown generally at I, is provided for transferring rolls R from the sealing station W' or the like of the wrapping machine W to the chains 26 of the bridge unit 25, the transfer mechanism I including a conveyor drum or magazine 93 having roll receiving recesses 93' spaced peripherally therearound. The drum 93 is mounted on a shaft 94 and is rotated to receive a roll R in each of the recesses 93' and carry it to a cooperating disc 95 having similar peripherally spaced recesses 95'. The disc 95 is rotated by shaft 96 to transfer the rolls R from the drum 93 to the chains 26, the disc 95 being tangentially arranged with the drum 93 and the chains 26 at the drive sprocket wheels 88.

*Drive mechanism.*—Referring to FIGS. 18–20, the drive mechanism 90 for synchronizing the movement of the chains 26 with the operation of the wrapping machine W will now be described. The wrapping machine W, transfer mechanism I and chains 26 of the loading device are all driven from a primary spur gear 97 secured to shaft 97' turned by a large spur gear 98 meshed with a smaller gear 99 mounted on shaft 99'. The smaller gear 99 is turned by a motor 100 through a belt drive 100' and a clutchbrake 101 (shown in phantom lines in FIG. 19).

A gear 102 meshed with the primary gear 97 forms part of the drive train for operating the wrapping machine W, and another gear 103 mounted on shaft 103' and meshed with the primary gear 97 forms part of the drive mechanism 90 for operating the transfer mechanism I and the chains 26. A spur gear 104 on shaft 104' is meshed with gear 103 to rotate the shaft 104' and turn another gear 105 secured on shaft 104'. Also secured to the shaft 104' are axially spaced cams 106 and 107 adapted to alternately contact switch actuating arms 108' and 109' of switches 108 and 109 is predetermined intervals in the rotation of the shaft 104', as will be more fully described presently.

The gear 105 is meshed with a spur gear 110 journaled on stub shaft 110' and having an axial collar extension 111 that may be segmented or cut away as at 111'. The gear 110 is also provided with an axially extending stud 112, the stud 112 and collar 111 forming the drive means for a Geneva motion cam plate 113. This cam plate 113 has radially extending elongated slots 114 adapted to receive the stud 112 and peripheral arcuate recesses 115 complementary to the curvature of the collar 111 and positioned intermediate each pair of slots 114. The cam plate 113 is keyed to a shaft 116', and a spur gear 116 is also secured thereto to be rotated by the Geneva motion to intermittently drive a gear train for operating the drum 93, the disc 95 and the sprocket wheels 88 of the chains 26. The gear train includes a spur gear 117 secured to the shaft 94 and meshed with the gear 116, a pair of transfer spur gears 118 and 118' meshed with the gear 117 and spur gears 119 and 120 secured to shafts 96 and 89, respectively, meshed with each other and driven by the gears 118 and 118' from the gear 117. Each of the gears is rotated in the direction of the arrows in FIG. 19, so that the roll drum 93 will be turned in one direction to carry rolls R tangentially to the disc 95, which is turned in the opposite direction to transfer the rolls R to the chains 26. The gear 120 for rotating the shaft 89 to turn the sprocket wheels 88 for driving the chains 26 is turned in the opposite direction relative to the gear 119 for rotating the disc 95.

The roll drum 93, disc 95 and sprocket wheels 88 are turned intermittently through the gear train from the Geneva motion, and the gear ratio is predetermined so that the roll R will be moved a predetermined distance each time the gear train is actuated. The movement of the rolls R in the transfer mechanism and chains 26 is also synchronized or coordinated with the operation of the wrapping machine W so that a roll is wrapped and moved to the roll drum 93 each time the drum is turned to move an empty recess 93' to roll receiving position from the wrapping machine W.

The Geneva motion cam 113 and drive means 111, 111' and 112 operate in a conventional manner, the gear 110 being driven continuously in the direction of the arrow in FIG. 19 by gear 105 to carry the stud 112 around the shaft 110'. The stud 112 is shown in FIG. 19 moving out of a slot 114 and will move around the shaft 110' counterclockwise and upwardly into another slot 114, this portion of its path comprising the dwell time or period during which the gear train and the roll drum 93, disc 95 and chains 26 are at rest. During this dwell portion of the cycle, the collar 111 rotates in the recess 115 between the slot 114 that the stud 112 has left and the slot 114 which the stud will next enter. Accordingly, the collar 111 keeps the cam plate 113 in fixed position during the dwell time, preventing any drift or coasting thereof. The segmented portion 111' of the collar 111 receives the projections of the cam plate 113 defined by the slots 114 and recesses 115 so that these projections will pass the collar 111 as the cam plate 113 is turned by the stud 112 entering a slot 114 and turning the plate 113.

The switches 108 and 109 will be described more fully hereinafter in connection with the electrical circuit for operating the loading device L; however, the cams 106 107 for closing the switches 108 and 109, respectively, are coordinated with the Geneva motion device so that the switches will be closed only during the dwell time of the drive mechanism 90. Switch 108 is a circuit conditioning switch in that it merely actuates a relay to condition the gate opening circuit for operation when switch 109 is closed. Switch 109 comprises a dwell time switch so that this circuit for opening gates 31 will only be completed during the dwell time of the drive mechanism 90 whereby the bank of rolls R discharged from the chamber 32 by the opening of the gates 31 will drop straight downwardly onto the primary storage 33. Accordingly, cam 106 contacts switch actuating arm 108' as the stud 112 moves out of a slot 114 or at the beginning of the dwell time, and cam 107 contacts switch actuating arm 109' after switch 108 has reopened by the passing of cam 106 but during the dwell time of the chains 26.

Although a Geneva motion drive mechanism 90 has been disclosed, it will be understood that any suitable drive mechanism may be provided.

*Discharge mechanism.*—Referring again to FIGS. 13–17, the gates 31 comprise longitudinal L-shaped members having walls 121 projecting toward each other below the side plates 79 of the lower conveyor portion 29 to support the ends T and E of the rolls R. Each of the gates 31 is connected to a pivot member 122 supported on the frame 75 by a pivot pin 123 for swinging movement away from roll supporting or closed position, the pivot members 122 being connected by links 124 to plungers 125 which are adapted to be moved between gate opening position and gate closed position by solenoids 126 and 127, respectively, see FIGS. 13, 16, 17 and 28*a*. Therefore, when the solenoids 126 are energized, the gates 31 are swung away from closed position and permit rolls R to drop from the chamber 32 and the solenoids 127 being energized to close the gates 31 and to keep them closed except during actual roll dropping operations. The circuits for energizing the solenoids 126 and 127 will be described hereinafter. A normally open microswitch 128 (FIGS. 14 and 28*b*) is connected to one of the gates 31 by a switch actuating member 128', the switch 128 being closed when the gates are opened to condition a relay for preventing the gates from opening again until the rolls R on the primary storage rack 33 are discharged onto an empty flight 20. The operation of the switch 128 will also be described more fully hereinafter.

The primary chamber or storage rack 33 positioned beneath the chamber 32 is adapted to receive a bank of rolls R therefrom when the gates 31 are opened. The storage 33 includes the spaced tines or fingers 34 connected to or formed integral with a support member 129 pivotally connected at 130 to L-shaped frame members 131 which are secured to the loading device frame 75, FIGS. 16 and 17. The storage rack 33 is adapted to rock between a substantially horizontal loaded position and a canted unloaded or empty position, the rack 33 having a counterbalance weight 132 carried on a rod 133 for moving the rack to the latter position when rolls R have been discharged from the tines 34. However, the weight of a predetermined number of rolls R is sufficient to move the rack 33 to its horizontal position. A crossbar 134 is secured to the rearward end of the rod 133 for closing a pair of normally open microswitches 135 and 136, FIGS. 13, 22 and 28*b*, above the counterbalance rod 133 when the rack 33 is in horizontal loaded position, and also for closing a normally open microswitch 137 below the rod 133 when the rack 33 is in unloaded position. The microswitch 135 is in the pusher bar actuating circuit, the switch 136 is in the automatic operating circuit and the switch 137 is in the gate opening circuit to be described hereinafter.

The pusher bar 35 adapted for reciprocation relative to the storage rack 33 comprises a longitudinal bar which extends parallel with the support member 129 and is normally positioned adjacent thereto. A modified pusher bar assembly 35′, FIGS. 26 and 27, will be described more fully hereinafter. When the pusher bar 35 is moved forwardly to discharge a bank of rolls R from the tines 34 of the primary storage, the leading ends E of the rolls R are moved into contact with a longitudinal brush 138 secured to the frame of the loading device L by spaced support members 138′ (FIGS. 14 and 17). The brush 138 retards the movement of the rolls slightly so that a pressure is exerted on the ends T and E by the pusher bar 35 pushing the rolls R against the brush 138. Accordingly, any loose end flaps on the rolls will be closed by this pressure to assist in obviating the problem of jamming as a result of loose end flaps. A vertical abutment plate 151, FIGS. 13 and 22, is secured to a frame member 153 or the like and extends across the conveyor C substantially parallel with the flights and has a lower margin 151′ a predetermined distance above the upper surface 23′ thereof. The abutment is adapted to remove any rolls R accidentally dropped onto a filled flight 20 and discharge them into a suitable hopper (not shown) thereby preventing a jam condition to occur. Other anti-jamming mechanisms and circuits will be developed hereinafter.

*Pusher bar mechanism.*—Referring now particularly to FIGS. 13 and 21–23, the pusher bar mechanism 139 will now be described. The pusher bar 35 is carried on spaced rods 140 which extend through apertures 141 in the support member 129 and are secured to a cross bar member 142 at their rearward ends. Each end of the cross bar member 142 is mounted on a slide plate 143 received in a cooperating guide member 144 rigidly secured to the conveyor frame 10 by a bracket 145, the slide plate being adapted for rectilinear reciprocating movement longitudinally relative to the conveyor C. The rearward end of the slide plate 143 is provided with a pivot pin 146 movable in a longitudinal slot 147 in the guide member 144, the pin 146 being connected to a link 148 pivoted at 149 to crank throw wheels 150. These crank throws for moving the ends of the cross bar member 142 are mounted on a cross shaft 152 journaled in suitable frame members 153 secured to the main conveyor frame 10 by a cross frame 154, FIG. 13. A sprocket wheel 155 is journaled on the shaft 152 and is continuously driven by a chain 156 from a sprocket 157, a tension sprocket wheel 158 being secured by arm 159 to a frame member 160 connected to main frame 10 by cross frame member 161. As will appear presently, the speed at which the sprocket wheel 155 is driven is predetermined so that when the shaft 152 is rotated, the pusher bar 35 will be advanced in timed relationship with the movement of an empty conveyor flight 20 to the roll discharge position at the front of the primary storage 33.

An over-riding single revolution clutch 163 has a member 164 keyed to the sprocket wheel 155 and another member 165 keyed to the shaft 152, the other member 165 having a stud 166 projecting therefrom for engagement by a striker bar assembly 167. The striker bar assembly 167, FIG. 23, includes a stroker bar 168 having one end pivoted to a frame member 169 by a pin 170, and extending toward the stud 166. The other end of the striker bar is grooved to receive a bar extension 171 which projects beyond the end of the striker bar 168 and is slidable relative thereto, the extension being biased toward the stud 166 by a spring 172. Another spring 173 extends between the striker bar 168 and a frame member 174 to bias the former downwardly. The springs 172 and 173 coact to retain the striker bar 168 and extension 171 in a position to be contacted by the stud 166 after one revolution of the shaft 152 so that the clutch members 164 and 165 will have relative rotation. A solenoid 175 secured to the cross frame 154 has a plunger 176 pivoted to the striker bar 168, the energization of the solenoid 175 raising the striker bar and extension from the stud 166 so that the clutch 163 becomes engaged and the shaft 152 is turned to actuate the crank throws 150. Accordingly, the pusher bar 35 is actuated when the solenoid 175 is energized whereby rolls R in the primary storage 33 are discharged onto an empty conveyor flight 20. The pusher bar actuating circuit for energizing the solenoid 175 will be described hereinafter. However, an important element of the loading device electrical circuits is a master microswitch 177 having a transfer contact blade 177′ normally held in a closed position with a contact 177″ by the cross bar member 142 of the pusher bar mechanism contacting the switch actuating member 178 for the switch 177, FIGS. 13 and 28*b*. When the pusher bar 35 is actuated, the contact bar 177′ is spring biased forwardly to a closed position with another contact 177‴ of the switch 177.

The sprocket 157 for driving the sprocket wheel 155 is rotatably mounted on a drive shaft 179 journaled in the frame members 160 and 169, the sprocket 157 being connected to the shaft 179 through a clutch 180 having a driven member 181 secured to the sprocket 157 for rotation therewith and a drive member 182 secured to the shaft 179 by a key 183 for rotation therewith. The members 181 and 182 are provided with dogs 184 and 185 which are in contact when the clutch 180 is engaged and the sprocket 157 is being driven. However, the drive member 182 is slidable axially on the key 183 and shaft 179 to move away from the driven member 181 so that clutch 180 may be disengaged for stopping rotation of the sprocket 157. The drive member 182 is normally biased into driving position with member 181 by a compression spring 186 on the shaft 179, a back-up plate 187 being provided for the spring 186. The drive member 182 is moved out of engagement with the driven member 181 by the energization of solenoid 188 acting through a yoke-type plunger 189 pivotally connected to the drive member 182. The solenoid 188 is only energized in case a jam or the like occurs as will be set out hereinafter, and it is apparent that the sprocket 157 will normally be connected to the shaft 179 through the clutch 180.

The outer end of the shaft 179 is also journaled in suitable bearings in the main frame 10 (FIG. 13), and a sprocket wheel 191 is secured to the shaft 179 inwardly of the frame journal. The sprocket wheel 191 is tangentially driven by the main conveyor chain 11 for rotating the shaft 179, and the circumference of the sprocket wheel 191 is predetermined so that a single revolution of the shaft 179 will correspond to a predetermined longitudinal movement of the conveyor flights 20. If desired, a catapillar drive may be used instead of the sprocket wheel 191 to assure that the shaft 179 is driven continuously.

*Sensing mechanism.*—A sprocket wheel 192 is secured to the outer end of the shaft 179 for driving another sprocket 193 by a closed chain 194, this drive means comprising a portion of the sensing mechanism 36 for the bridge 25. The sprocket 193 is mounted on the outer end of a shaft 195 journaled in the main frame 10, FIGS. 13, 24 and 25. The shaft 195 is also journaled in a bracket 196 secured to a housing 197 mounted on the bridge unit frame. The inner end of the shaft 195 is provided with a bevel gear 198 meshed with another bevel gear 199 on the end of stub shaft 200 journaled in the housing 197. The other end of the stub shaft 200 carries an elongated cam 201 having diametrically opposite concave portions 202. A cam follower 204 rides on the top of the cam 201 and is mounted on a vertical rod 205 extending through the bottom of the housing 197. A yoke 206 is secured to the rod 205 and a roller or flight sensing contact 207 is rotatably mounted in the yoke 206 on shaft 208. The upper end of the rod 205, to which the cam follower 204 may be secured, has an arm 209 or the like extending through a vertical slot 210 formed in the housing wall 197. The free end of the arm 209 is connected to an actuating member 211′ of switch 211 in the pusher bar actuating circuit, FIG. 28*b*. As shown best in FIG. 24, the roller 207 is positioned a predetermined distance above the conveyor flights 20 by the cam follower 204 riding on the cam 201, and is adapted to reciprocate vertically as the cam 201 is rotated. The speed of rotation of the cam is controlled through its drive so that the roller 207 is in lowered position as each conveyor flight 20 passes therebelow. When a loaded conveyor flight 20 passes under the sensing mechanism 36, the roller 207 will contact the rolls R thereon before the cam follower 204 reaches the lowest point of the concave portion 202 of the cam 201 so that the switch 211 will remain open. However, when an empty flight 20 passes under the sensing mechanism 36, the cam follower 204 will follow the concave cam surface 202 so that the roller 207 moves downwardly and the arm 209 carries the actuator member 211′ into switch closing position. The electrical circuit including the switch 211 will be described hereinafter. It is apparent that the cam 202 may be changed to sense flights 20 or the like in any predetermined spaced relation as they are moved past the roller 207.

*Modified pusher bar.*—Referring now to FIGS. 26, 27, 27*a*, 27*b* and 27*c*, the modified pusher bar 35′ for the loading device L will now be described using similar reference numerals for similar elements described hereinbefore. The support member 129 of the storage rack 33 has a rearwardly-extending channel-shaped portion 212 defining a longitudial chamber 212′, and longitudinal openings 213 are formed in the bottom wall of the support member 129 rearwardly of the tines 34 through which rolls R fall into a suitable container or tray (not shown) in the event rolls R are displaced behind the pusher bar mechanism 35′. Accordingly, a jam condition is obviated as will become clear presently. The modified pusher bar 35′ comprises forward and rearward longitudinal bars 214 and 215 mounted on the forward reduced end portions 216 of the pusher bar rods 140, which are secured at their rearward ends to the cross bar member 142 and actuated by the pusher bar mechanism 139 to reciprocate the bars 214 and 215 for discharging rolls R from the primary storage 33 onto an empty conveyor flight 20.

The bars 214 and 215 are adapted to move relative to the reduced ends 216 of the rods 140, but are normally biased apart into abutment with shoulders on the rods 140 by springs 217 circumscribing the rods intermediate the bars 214 and 215. The bars are normally in parallel relationship when at rest and during roll discharging operation, the force of the spring 217 being predetermined to maintain the forward bar 214 in abutment with the forward shoulder as it pushes rolls R from the tines 34.

The bars 214 and 215 are positioned in front of the chamber 212′ when in retracted or inoperative position and the bars 214 and 215 are provided with rearwardly extending rods 218 and 219 at each end, the rods 218 extending through apertures 218′ in the bar 215 and the channel wall 212 of the support member 129 and the rods 219 extending through apertures 219′ in the channel wall 212 support member 129. A contact member 220 is pivotally secured to the rods 218 and 219 at each end of the bars, the rods 218 having a vertical end portion 221 pivoted to the contact intermediate its ends and the rods 219 having a saddle end portion 222 pivoted to the lower end of the contact 220. The upper end of the contacts 220 includes a contact plate 223, which is normally positioned in a vertical plane. Secured at the ends of the cross bar member 142 by brackets 224 are jam switches 225 having actuating arms 226. The switches 225 form part of the jam circuit, FIG. 28*b*, to be described in connection with the electrical circuit hereinafter, but it is apparent that the switches 225 are closed by the abutment of the contact plate 223 with the actuating arm 226, FIGS. 27*b* and 27*c*. Although the openings 213 is provided behind the pusher bar 35; a jam condition may possibly occur by a roll R falling between the support member 129 and the rearward bar 215 during the actuating of the pusher bar 35′ whereby the bar 215 will be cammed forwardly toward the bar 214 by the compression of the spring 217. This may take place at either or both ends of the pusher bar 35′. Accordingly, the rod 219 will be drawn forwardly to pivot the contact member 220 on its pivoted connection with the rod end 221 so that the contact plate 223 moves the arm 226 into switch closing position, FIG. 27*c*. The same action of the contact member 220 may also occur when the forward bar 214 is jammed rearwardly relative to the bar 215 by a roll being jammed against the gate 31 or the tines 34, the rod 218 being actuated rearwardly to pivot the contact member on the saddle 222 to close the switch 225. The present pusher bar assembly provides an improved means for applying a uniform pushing or pulling force throughout its length.

*Gate jam switches.*—Another jam condition that may result during the operation of the loading device L is that the gates 31 may become jammed while in open condition by rolls R or other means whereby the continued function of the loading device L cannot be permitted. Gate jams may occur in any one of several ways. For instance, an unglued label on a roll may cause the roll to hang on one of the gates 31 instead of dropping onto the the storage rack 33 whereby the gates may remain open, or one of the solenoid armatures 124 may move a shorter distance than the other so that rolls are dropped irregularly. A roll may also hang in the gates in such a manner that the gates close but so that the actuation of the pusher bar 35 or 35′ jams the roll R into the gate 31 to move it to an open position.

Accordingly, each gate 31 is provided with a jam switch 227, FIGS. 14 and 28*b*, having an actuating arm 227′ coupled to the gate 31. Whenever the gates 31 are opened the switches 227 are closed, but when the gates 31 close normally the switches will not complete a circuit. Jam clearing mechanism 228, FIG. 28*a*, is also provided for discharging any rolls R from the gates 31 in the event that a jam is caused. The jam clearing mechanism 228 includes a pair of vibrators 229 and 229′ driven by a motor 230 for alternately opening and closing contacts in circuits to the gate open and close solenoids 126 and 127, respectively. Therefore, when the gates 31 become jammed the solenoids 126 and 127 are alternately energized for a predetermined time interval to open and close the gates 31 whereby the roll causing the jam will be discharged onto the storage rack 33. These jam switches 227 and jam clearing mechanism 228 and the circuits therefor will be described more fully presently.

*Electrical circuit for loading device.*—Referring now to FIGS. 28*a* and 28*b*, the electrical circuit for the loading device L includes a plurality of relays 231, 232, 233 and 234. Each of these relays comprises a "latch-pick, latch-release" type relay having a pair of solenoids for moving a plunger or armature between a "latched-up" position and a released position. The term "latched-up" or "latch-pick" is used to designate a condition in which an armature is moved by a latch-pick solenoid to a first position and is held in that position by mechanical means after the latch-pick solenoid has been de-energized. The release solenoid must then be energized to disengage the armature from the mechanical means and move it to released position. This type of relay is well known in the art.

The master relay 231, FIG. 28*a*, includes a latch-pick solenoid 235, a release solenoid 236 and an armature 237. The armature carries a plurality of transfer contact blades 238—242 adapted to be moved into and out of circuit closing position with pairs of fixed contacts 238′—242′, respectively. One of each of these contacts is connected to a main lead 243 by a lead 244, the other main lead 245 being connected to ground. A start switch 246 is connected between the main lead 243 and one side of the latch-pick solenoid 235 and the other side of the solenoid 235 is grounded. Accordingly, when the start switch 246 is pressed, the solenoid 235 is energized to latch-up the armature 237 for normal operation of the loading device L. When the armature is latched-up, the contacts 239′, 240′ and 242′ are closed by their transfer contact blades, and contacts 238′ and 241′ are open.

*Automatic-manual circuit*.—The contact 240′ is connected by a lead 247 to a magnetic motor starter switch 247′ which may be manually operated to start the motor 100, FIG. 28*b*. The switch 247′ is of conventional construction and has a hold circuit for keeping the switch closed during normal operation, the switch also having a magnetic start coil to be described hereinafter. The motor 100 is started to actuate the drive mechanism 90 through the clutch 101, which is engaged by the energization of a solenoid 248 when the start-stop relay 232 is latched-up. The start-stop relay 232, FIG. 28*a*, includes a latch-pick solenoid 249, a release solenoid 250 and an armature 251, the armature carrying transfer contact blades 252 and 253 for circuit closing contact with pairs of contacts 252′ and 253′. The solenoid 248 for engaging clutch 101 is connected to one contact 252′ by a lead 254 and the other contact is connected by a lead 255 to the contact 242′ of the master relay 231, the contacts being closed when the armature 251 is latched-up by the solenoid 249 of relay 232 so that the solenoid 248 for the clutch is energized.

An automatic-manual throw switch 257, FIG. 28*a*, having a blade 257′ is provided for operating the loading device L automatically or manually, the blade 257′ being connected by lead 258 to the motor lead 247 and movable between a contact designated "auto" for automatic circuit and another contact designated "man" for manual circuit. The manual contact is connected by parallel leads 259 and 259′ to one side of run and stop switches 260 and 261, the other side of the run switch 260 being connected by lead 262 to the latch-pick solenoid 249 of relay 232. The other side of the stop switch 261 is connected by lead 263 to the release solenoid 250 of relay 232. Therefore, in manual operation, the solenoid 248 for the clutch is energized by closing the run switch 260 and is de-energized to disengage the clutch 101 by closing the stop switch 261. The release solenoid 250 of relay 232 is also connected by lead 264 to the contact 241′ of the master relay 231 so that when the master relay is in released condition, the relay 232 is also in released condition whereby manual operation of the loading device L cannot be started without closing the main start switch 246 for latching up the main relay 231 closing the start switch 247′ for starting the motor 100 and closing the run switch 260 for latching-up the relay 232.

The automatic circuit for operating the loading device L includes the roll actuated automatic switch 92 which is closed by a roll R in the chains 26 being moved into contact with the arm 92′ of the switch to indicate that a bank of rolls in the chamber 32 is positioned to be dropped through the gates 31 to primary storage 33. The switch 92 includes a switch blade element 266 connected by lead 267 to the automatic contact of the throw switch 257, the blade 266 being movable between a first position with a contact 268 and a second position with another contact 268′. The first position is the normal released condition of the switch and the second position is effected by the roll actuation of arm 92′. The contact 268 is connected by lead 269 to one contact 253′ of the relay 232, the other contact 253′ being connected by lead 270 to a lead 271 connected to the lead 262 to the latch-pick solenoid 249 of relay 232. The contact blade 253 of relay 232 is in circuit open position relative to the contacts 253′ when the armature 251 is latched-up during normal operation of the loading device L. However, when the relay 232 is released and the solenoid 248 for clutch 101 is deenergized, the contacts 253′ are closed so that when the gates 31 open to drop a bank of rolls R from the chamber 32, the switch blade 266 of switch 92 will close the automatic circuit through the contacts 253′ to the latch-pick solenoid 249 of relay 232 whereby the solenoid 248 will again be energized to actuate the drive mechanism 90 of the wrapping machine W, transfer mechanism and chains 26 of the loading device so that rolls R are again carried into the chamber 32.

The contact 268′ of the switch 92, FIG. 28*a*, is connected by lead 272 to switch blade 273 of the automatic circuit microswitch 136, FIG. 28*b*, the switch blade 273 being moved between upper and lower fixed contacts 274 and 274′. The blade 273 is moved upwardly by the cross bar 134 of counterbalance weight rod 133 when the primary storage 33 is loaded with a predetermined number of rolls R, and is moved downwardly automatically when the storage rack 33 is empty. The upper contact 274 is connected by a lead 275 to the lead 263 to the release solenoid 250 of relay 232. It is apparent that when the primary storage 33 is loaded with rolls R and the chamber 32 is also loaded with rolls R so that blade 266 of switch 92 is moved upwardly, the relay 232 will be released and the solenoid 248 to clutch 101 will be de-energized to shut down the wrapping machine W and loading device L. Then whenever the rolls R in primary storage 33 are discharged onto an empty conveyor flight 20 and the rolls R in the chamber 32 are discharged to primary storage 33, the blade 266 of switch 92 will close the automatic circuit through cnotacts 253′ to the latch-pick solenoid 249 of relay 232 to start the operation of the wrapping machine W and the loading device L. As will be presently described more fully, in normal operation the rolls R in primary storage 33 will be discharged to a conveyor flight 20 before the chamber 32 becomes filled. Accordingly, the switches 92 and 136 will normally not be closed at the same time to complete the circuit to the release solenoid 250 and the relay 232 will remain latched-up.

The lower contact 274′ is connected by a lead 276 to one of a pair of fixed contacts 277′ of relay 233, FIG. 28*a*, the other contact 277′ being connected by a lead 278 to the lead 271 to the latch-pick solenoid 249 of relay 232. Thus, another circuit is provided for energizing the latch-pick solenoid 249, and this circuit comprises a portion of the jam circuit and will be described hereinafter.

An automatic operating lamp 279 mounted on the switchboard S is connected to the automatic contact of switch 257 by lead 280 to show that the loading device L is operating on the automatic circuit. Suitable lamps (not shown) may also be provided for indicating that the loading device L is being operated on the manual circuit.

*Master microswitch 177*.—The blade 177′ of master microswitch 177, FIG. 28*b*, is connected directly to the contact 239′ of the master relay 231 by lead 281. The gate opening circuit, the sensing circuit and the pusher bar circuit are all connected to the master microswitch 177 having the contact 177″ normally closed by the switch blade 177′ by the abutment of the pusher bar cross member 142 with the actuating arm 178 for the blade. The master switch 177 also has contact 177‴ which is closed by the blade 177′ when the pusher bar is actuated to discharge rolls R from primary storage 33.

Before describing the rest of the circuits, the elements of the relays 233 and 234 will now be described. The relay 233, FIG. 28*a*, includes a latch-pick solenoid 284, a release solenoid 285 and an armature 286 carrying the transfer contact blade 277 for the fixed contacts 277′.

The armature also carries transfer blades 287 for fixed contacts 287′ and transfer blade 288 for fixed contacts 288′. The relay 234, FIG. 28*b*, includes a latch-pick solenoid 289, a release solenoid 290 and an armature 291 carrying transfer blades 292, 293 and 294 for fixed contacts 292′, 293′ and 294′, respectively.

*Gate opening circuit.*—The circuit for opening the gates 31 includes a lead 295 connected to the normally closed contact 177″ of master switch 177 and a lead 296 from the lead 295 to the switch blade 297 of the roll actuated switch 91. The blade 297 is moved from an open position when the actuating arm 91′ is not contacted by a roll R to a closed position with a fixed contact 297′ when a roll R contacts arm 91′. Accordingly, switch 91 is closed when a bank of rolls R are in the chamber 32 in position to be dropped to primary storage by opening the gates 31. The contact 297′ is connected by lead 298 to a fixed contact 299′ of the circuit conditioning switch 108 and to a lower fixed contact 300′ of the dwell time switch 109, both switches 108 and 109 being part of the transfer mechanism and shown in FIG. 28*b*. The other contact 299′ of relay 233 and the other contact 288′ is connected to the release solenoid 285 of relay 233 by lead 302. The relay 233 must be in released condition before the gate opening circuit can be completed through switch 109 and contact blade 299 of switch 108 will be cammed into closed position by cam 106 prior to the closing of switch 109 whereby the circuit to the release solenoid 285 of relay 233 will be completed.

The other contact 300′ of the dwell time switch 109 is connected by a lead 304 to a contact 292′ of relay 234, the other contact 292′ being connected by lead 305 to the transfer contact blade 306 of the lower microswitch 137 which is moved to closed position with a fixed contact 306′ by the counterbalance weight 132 when the primary storage 33 is empty. The contact 306′ is connected by lead 307 to one contact 387′ of relay 233, and the other contact 287′ is connected by a lead 308 to one of normally closed contacts 308′ of a relay 309 and the other contact 308′ is connected by parallel leads 310 to the gate open solenoids 126.

Accordingly, when the relays 233 and 234 are each in released condition so that contacts 287′ and 292′ are closed, the solenoids 126 will be energized when the master switch 177, roll actuating switch 91, dwell time switch 109 and lower counterbalance switch 137 are each closed. As previously pointed out, the master switch 177 is closed by the complete return of the pusher bar 35 or 35′ so that rolls R will not be dropped onto the storage rack 33 prematurely. The roll actuating switch 91 is closed by the contact of a roll R with the arm 91′ to indicate that a bank of rolls is in the chamber 32 in position to be dropped. The dwell time switch 109 is closed by cam 107 during the dwell period of the Geneva drive mechanism 90 so that the rolls R will be dropped straight downwardly. The lower counterbalance switch 137 is closed so that no rolls will be discharged from the chamber 32 until the primary storage 33 is empty.

When the circuit is completed to energize the solenoids 126, a coil 311′ of a switch 311 connected between ground and the lead 310 by a lead 310′ is also energized to open a spring-loaded transfer blade 312 of the switch 311. The switch 311 has fixed contacts 312′, one of which is connected by lead 313 to the lead 281 to the master switch 177. The other contact 312′ is connected by a lead 313′ to one of normally closed contacts 314′ of the relay 309, and a lead 314 connects the other contact 314′ to the gate closing solenoids 127. Accordingly, the solenoids 127 are normally energized to hold the gates 31 in closed position, but when the gate opening solenoids 126 are energized the solenoids 127 are de-energized. Of course, as soon as solenoids 126 are de-energized, solenoids 127 are immediately operative to close the gates 31 and hold them closed. The positive action of the solenoids 127 prevents any harmonic or bounce of the gates 31 as they close, and assures that they remain closed.

When the gate opening solenoids 126 are energized and the gates 31 are opened, the jam switches 227 are closed. The gate operated switch 128, FIG. 28*b*, is also closed during the period of time that the gates 31 are opened. The switch 128 includes a transfer blade 315 in normally open position and a fixed contact 315′, the latter being connected by lead 316 to the contact 177″ of master switch 177 and the former being connected by lead 317 to the latch-pick solenoid 289 of relay 234. Accordingly, as soon as the gates open, the relay 234 is latched-up to open contacts 292′ in the gate opening circuit and to close contacts 293′ and 294′. One of contacts 293′ is connected by lead 318 to the lead 316 to the master switch contact 177″, and the other contact 293′ is connected by lead 319 to a timer 320, FIG. 28*b*. The timer 320 is set into operation substantially immediately with the opening of the gates 31 to open the blade 321 of a normally closed switch 322 for a predetermined short time interval. The switch is in the pusher bar circuit and the timer 320 merely prevents the actuation of the pusher bar 35 or 35′ until the rolls R have setttled on the tines 34 of the storage rack 33.

*Pusher bar circuit.*—The circuit for operating the pusher bar mechanism includes the sensing switch 211 and the upper counterbalance switch 135, FIG. 28*b*. The switch 211 has fixed contacts 324, one of which is connected by lead 325 to the lead 295 to the master switch contact 177″ and the other being conencted by lead 326 to transfer contact blade 327 of switch 135. When a bank of rolls R are positioned on the storage rack 33, the upper counterbalance switch 135 is closed. The contact 327′ of switch 135 is connected by lead 328 to one side of the normally closed switch 322, which is opened only for a brief period by the timer 320 as just described. The other side of the switch 322 is connected to the striker bar solenoid 175. Accordingly, when primary storage 33 is loaded to close the upper counterbalance switch 135 and when the sensing switch 211 is closed to indicate an empty conveyor flight 20, the solenoid 175 will be energized to raise the striker bar 168 so that the clutch 163 will be engaged to rotate the cranks 150 and reciprocate the pusher bar 35 or 35′ to and from roll discharging position.

When the pusher bar 35 or 35′ moves forwardly, the transfer blade 177′ of master switch 177 moves into contact with fixed contact 177‴ which is connected by lead 330 to the latch-pick solenoid 284 of relay 233 whereby that relay will be latched-up. Therefore, contacts 277′ in the automatic circuit from switch 136 to latch-pick solenoid 249 of relay 132 will be closed, and contacts 288′ in the circuit between the release solenoid 285 of the relay 233 and the conditioning switch 108 will be closed. The contacts 287′ in the gate opening circuit will be open until the pusher bar 35 is returned to close master switch 177 and the roll actuated switch 91 and the conditioning switch 108 are closed. When these switches 177, 91 and 108 are closed, the release solenoid 285 of relay 233 will be energized.

The contact 177‴ of the master switch 177 is also connected by lead 331 to one of normally closed contacts 332′ of a by-pass release switch 333, FIG. 28*b*, the other contact 332′ being connected by lead 334 to one contact 294′ of the relay 234 and the other contact 294 being connected to the release solenoid 290 therefor. When the contact 177‴ of master switch 177 is closed by the actuation of the pusher bar mechanism, the solenoid 290 will be energized so that gate opening circuit will remain open. 292′ in the gate opening circuit will again be closed to condition the gate opening circuit for operation.

*By-pass circuit.*—The by-pass release switch 333 and a by-pass switch 335 are provided to disable the gate opening circuit so that rolls R may be carried through the chamber 32 of the loading device L and taken from the feed portion of the bridge unit 25 as when foreign labels are applied to the rolls R.

The latch switch 335 includes a transfer contact blade 336 and fixed contacts 336', one of which is connected by lead 337 to the lead 17 to the latch-pick solenoid 289 of relay 234 and the other contact 336' being connected by lead 338 to the lead 318 to master switch contact 177''. Accordingly, when the normally open latch switch 335 is closed, the latch-pick solenoid is energized and the relay 234 is latched-up. Inasmuch as the storage rack 33 is empty the release solenoid 290 of the relay 234 cannot be eenrgized so that gate opening circuit will remain open.

The release switch 333 includes a transfer contact blade 339 and fixed contacts 339' which are normally open. One contact 339' is connected to lead 338 by lead 340 and the other contact is connected in parallel with lead 334 to contact 294' to the release solenoid 290 of relay 234. Accordingly, when normal operation of the loading device L is desired, the release switch 333 is pressed to close contacts 339' to complete a circuit from the master switch contact 177'' to the release solenoid 290 of relay 234.

*Jam circuits.*—The jam circuits, FIG. 28*b*, are associated with the gates 31 and with the pusher bar 35' to immediately stop the operation of the loading device L if a jammed condition results, and to put into operation the jam clearing mechanism 228. A lead 343 is connected from the lead 281 in parallel to transfer blades 344 and 345 of the pusher bar jam switches 225 and the gate jam switches 227. Each of the jam switches 225 has a contact 344' connected by a lead 346 to a lead 347 to the release solenoid 236 of the master relay 231. Therefore, when either of the jam switches 225 is closed by a roll R jamming the pusher bar 35', the release solenoid 236 will be energized to release the relay 231 whereby the electrical circuit will be disabled.

Similarly, the contacts 345' of the gate jam switches 227 are connected in parallel by leads 348 to an upper contact 349 of the dwell time switch 109, the other contact 349 being connected by lead 350 to the lead 347 to the master relay release solenoid 236. The switches 227 are automatically closed by the opening of gates 31, but the jam circuit therethrough is normally open at this time inasmuch as the contact blade 300 for closing the contacts 349 is cammed out of contact therewith and a closed position with the contacts 300' for completing the gate opening circuit. However, if the gates 31 are jammed and the switches 227 remain closed after the contact blade 300 returns to close position with contacts 349, the master relay release solenoid 236 will be energized.

It is apparent that when either of the pusher bar jam switches 225 are closed or when either of the gate jam switches 227 are closed, provided that the dwell time switch 109 is in normally closed position to provide a circuit through contacts 349, the jam circuit is complete to the release solenoid 236 so that the master relay 231 is released. Accordingly, the normal operating circuits for the loading device L through contacts 239', 240 and 242' are opened and the circuit through contacts 241' is simultaneously closed to energize the release solenoid 250 of relay 232 whereby the operation of the loading device L is immediately stopped. The contacts 238' of the master relay 231 are also closed, one of the contacts being connected by a lead 351 to parallel leads 352 and 352' for energizing the solenoid 188 for disengaging the clutch 180 in the jam disengagement mechanism for the pusher bar mechanism, and for lighting lamp 353 for indicating that the master relay 231 is released as when a jam occurs.

When a jam has occurred and the entire loading device L has become inoperative, the jam is then cleared so that operation can again be started. Certain jam conditions may occur which will require manual clearing, which would include removing rolls from primary storage 33. In this case, the loading device operation can only be started by pressing the start switch 246 to energize the latch-pick solenoid 235 of master relay 231. The motor start switch 247', FIG. 28*b*, must also be closed and also the run switch 260 to latch-up relay 232 when the switch 257 is in manual position. However, when the switch 257 is in automatic operation and the roll actuated automatic switch 92 is not closed by a roll R, the latch-pick solenoid 249 of relay 232 will be closed through lead 269 and contacts 253' of relay 232. If the switch 92 is closed by a roll, the circuit to solenoid 249 is completed through lead 272 to upper counterbalance switch 136 and lead 276 through contacts 277' of relay 233 and lead 278 to the relay solenoid 249. The contacts 277' of relay 233 will always be closed by the energization of latch-pick solenoid 284 whenever the pusher bar is moved away from inoperative position. Also, the transfer blade 273 of upper counterbalance switch 136 will always be in closed position with contact 274' to lead 276 when the jam is manually cleared.

Although some jam conditions may require manual clearing, most jams are likely to occur at the gates 31 or between the gates 31 and the pusher bar 35'. Accordingly, the automatic jam clearing mechanism is provided, as will now be described.

*Jam clearing mechanism.*—The jam clearing mechanism 228, FIG. 28*a*, is provided to automatically open and close the gates 31 for a predetermined length of time when a jam has occurred whereby rolls R jammed in the gates or between the gates and the pusher bar 35' may be discharged onto the primary storage 33. As previously stated, the leads 308 and 313' are connected through normally closed contacts 308' and 314' of relay 309 to the gate open and gate close solenoids 126 and 127, respectively. The relay 309 also includes a solenoid 354 and a spring loaded armature 354' carrying contact blades 355 and 355' normally biased into closed position with contacts 308' and 214', respectively. Other sets of contacts 356 and 356' are in normally open position relative to blades 355 and 355', and are adapted to be closed by the energization of solenoid 354.

One of the contacts 356 is connected in parallel with contact 308' to the leads 310 to the gate open solenoids 126, and the other contact 356 is connected by lead 357 to a vibrator contact 357' adapted to be opened and closed with another vibrator contact 357' by the vibrator 229 of jam clear mechanism 228. Similarly, one contact 356' is connected in parallel with contact 314' to the lead 314 to the gate close solenoids 127, and the other contact 356' is connected by lead 358 to a vibrator contact 358' adapted to be opened and closed with another vibrator contact 358' by the vibrator 229' of jam clear mechanism 228. The vibrators 229 and 229' open and close contacts 357' and 358' alternately so that the solenoids 126 and 127 are alternately energized to open and close the gates 31. The solenoid 354 of relay 309, the motor 230 for rotating the vibrators 229 ad 229' and each of the other vibrator contacts 357' and 358' are connected to a common lead 359 to a normally closed contact 359' with a switch blade 360. The switch blade 360 is connected by lead 361 through a fuse to the contacts 241' of the master relay 231, which are closed when the relay is released as when a jam occurs. The contacts 241' are also connected by lead 362 to a timer 363 connected to the switch blade 360 for moving it into a closed position with contact 360' after a predetermined interval.

It is apparent that when a jam occurs, the master relay 231 is released to stop the loading device L and close contacts 241' whereby the motor 230 turns vibrators 229 and 229' and the solenoid 354 of relay 309 is energized to connect the vibrator contacts 357' and 358' in the circuit to the gate open and close solenoids 126 and 127. After the gates 31 have been vibrated between open and closed position a predetermined time, the timer 363 moves switch blade 360 into closed position with contact 360'.

The contact 360' is connected by a lead 364 to a solenoid 365 of a relay 366, FIG. 28*a*, the relay 366 having a spring loaded armature 365' carrying a plurality of transfer blades 367, 368 and 369 for movement into closed position with contacts 367', 368' and 369' when the solenoid 365 is energized. One of each of the contacts 367', 368' and 369' is connected by lead 370 to the main line 243. The other contact 367' is connected by lead 371 to the latch-pick solenoid 235 of master relay 231 in by-pass relationship with the main start switch 246. The other contact 368' is connected by lead 372 to lead 328 to the solenoid 175 for releasing the single revolution clutch 168 so that the pusher bar 35' will be reciprocated. The other contact 369' is connected by lead 373 to a starter coil 374 in the magnetic motor starter switch 247' whereby the switch is automatically closed and the motor 100 will operate when the switch 257 is in automatic position.

It is now apparent that after a jam has occurred and the gates 31 are vibrated to clear the jam, the timer 363 closes a circuit to a re-start relay 366 so that the electrical circuit to the entire loading device L will be operative.

*Roll Aligning Mechanism*

The roll aligning mechanism 38, FIGS. 29–34, is associated with the master conveyor C and includes the contact members 40 extending transversely of the conveyor C or parallel with the conveyor flights 20, the members being secured in predetermined spaced relation on the closed chains 39 for intermittent movement therewith. The contact members 40 are alternately carried into an upper horizontal path in which the leading contact surfaces 42 of the upper member 40 is positioned above the upper surfaces of the flights 20, each member 40 being moved into the upper path intermediate adjacent flights 20. In the upper path, the member is moved forwardly in the direction of flight movement at a rate of speed greater than the speed of the flights. Accordingly, the surfaces 42 of the member 40 are moved into proximity with the trailing edge of the flight 20 to contact any misaligned rolls R overhanging the trailing flight edge and to move them forwardly relative to the flight 20. Thus, the rolls R are aligned or positioned on the flight 20 and the vertical abutment plate 24 may assist in the positioning of the rolls by stopping the forward movement thereof relative to the flight 20. The forward movement of the members 40 is stopped at the end of its upper horizontal path at which point the surfaces 42 have been moved to or just past the trailing edge of the flight 20, and the drive mechanism of the members 40 has a brief dwell period so that the flight moves to permit the upper member to be moved into the lower path and clear the flight, and so that the lower member will move into the upper path intermediate adjacent flights.

The length of the path of the members and the rate of speed at which they are moved is predetermined so that the members 40 will alternately be moved into roll aligning position with each of the conveyor flights 20. Furthermore, as will become more apparent presently, the flight aligners 38 are driven directly from the master conveyor so that the speed of the former is proportional with the speed of the latter. A plurality of roll aligning mechanisms 38 may be provided to assure that rolls are aligned at several places along the conveyor 10 and soon after the rolls R are deposited on the flights 20.

The roll aligning mechanism 38 may be driven tangentially from one of the chains 11 by a sprocket wheel 377 journaled on a stub shaft 378 in the main frame 10 and coupled thereto through a clutch 379, FIG. 30. However, if desired a catapillar drive may be provided instead of the sprocket wheel 377. The clutch includes a drive member 380 secured to the sprocket 377 and a driven member 381 secured to the shaft 379. An intermediate member 382 is axially slidable relative to the shaft 378 and the driven member 381 has a key 383 received in the driven member. A shear pin 384 extends between the drive and intermediate members 380 and 382 so that rotation is transferred from the sprocket 377 to the shaft 378 through the drive member, the shear pin, the intermediate member, the key and the driven member. The drive and intermediate members are provided with a compression spring 385 which biases them apart except for the shear pin 384, and a microswitch 386 is secured to the frame 10 by bracket 387 and has an actuating arm 386' in position to be moved to switch closing position by the intermediate member 382 if it is moved axially by the spring 385 in the event the shear pin 384 should break.

Referring to FIGS. 29–31, a spur gear 389 is secured to the outer end of the shaft 378 and a smaller spur gear 390 is mounted on shaft 390' and meshed with gear 389 for continuous rotation therewith. Another spur gear 391 is secured to stub shaft 391' journaled in frame 10, the shaft 391' also having a sprocket wheel 392 secured on its inner end. The chain 39 extends around a pair of sprockets 393 and 394 journaled on shafts 393' and 394', respectively, the shaft 393' having another sprocket 395 secured thereto outwardly of sprocket 393. A drive chain 396 extends around the sprockets 392 and 395 for transmitting rotation to the sprocket 393 for driving the chain 39 in its closed path.

It is now apparent that the gear 390 is driven continuously from the gear 389 through the clutch 379 and sprocket 377 from the chain 11, and that gear 391 is driven by gear 390 to turn the sprocket 392 and chain 396 which drives chain 39. The intermittent motion of chain 39 is provided by the gears 390 and 391 and cams associated therewith as will now be described.

Referring particularly to FIGS. 30, 32 and 33, the gear 391 is provided with an arcuate recess or segmented portion 398 substantially complementary to the outer periphery of the gear 390, FIG. 32*b*. The axial depth of the gear 391, FIG. 30, is greater than that of the gear 390 and a plate 399 is secured to the gear 390 and has an arcuate follower 400 adapted to be received into the segmented portion 398 to prevent rotation of the gear 391 for a predetermined interval comprising the dwell period for the members 40. Another plate 401 is also mounted on shaft 390' for rotation with gear 390 and plate 399, the plate 401 having a cam projection 402 with an abutment margin 403. The plates 399 and 401 are arranged so that the projection 402 of the latter is positioned at the terminal end of the arcuate follower 400 of the former. The gear 391 is also provided with a plate 404 having a notch 405 with an abutment surface 406, the plates 401 and 404 being aligned and the notch 405 being adapted to receive the projection 402 therein. The abutment of the projection 402 with the surface 406 of notch 405 causes the rotation of gear 391 following the dwell period so that the teeth gears 390 and 391 will mesh properly, FIGS. 33*a* and 33*b*.

In the operation of the roll aligning mechanism 38, the gear 390 is driven continuously and the segmented gear 391 and cams 401 and 404 provide the intermittent drive for the chains 39. The follower 400 of plate 399 merely maintains the gear 391 in fixed position during the dwell time of the member 40. The micro-switch 386 is in a circuit to the main drive means 16 for the master conveyor C so that the entire conveyor line will stop if the shear pin 384 breaks and the switch 386 is opened.

*Flight Stabilizing Device*

Referring specifically to FIGS. 10, 11, 14, 15 and 31, it will be seen that the present apparatus is provided with flight stabilizing means 408 at each loading device L, roll aligning mechanism 38 and discharge device D. Each stabilizer device 408 comprises an elongated shoe 409 having a horizontal lower surface 410 and an upturned rearward end portion 411. A pair of vertical rods 412 are secured to the shoe 409 and extend upward through a bracket 413 secured to the conveyor frame 10 by cap screws 414 or the like. Each rod 412 is circumscribed by a compression spring 415 seated against the shoe 409 and bracket 413 for biasing the shoe downwardly, and a plate, cotter key or the like 416 is secured to the rods 412 above the bracket 413 to limit downward movement of the shoe 409.

The lower surface 410 of the shoe is normally positioned in susbtantially the same plane as the upper surface 22'' of the flight end member 22', the upturned end 411 of the shoe 409 being adapted to more smoothly receive the end member 22' of each flight 20 thereunder. The shoe is biased downwardly by the springs 415 to slidably support the flight against the lower surface 410 whereby the flight 20 is prevented from rocking so that roll aligning, loading or discharging of rolls R to and from the flights 20 is facilitated.

Flight stabilizers 408 may be provided on opposite sides of the conveyor to assure uniform control of each flight during any operation of the apparatus that adds, aligns or removes rolls on the flight. As shown best in FIG. 31, each stabilizer shoe 409 is of sufficient length to contact more than one flight thereby holding the shoe in a raised position to receive flights thereunder.

*Discharge Device D*

The discharge device D (FIGS. 1, 2, 7–9 and 34–44) is adapted to selectively discharge banks of rolls R from loaded conveyor flights 20 and transfer them to a packaging machine P or the like. A plurality of discharge devices D may be associated with the present transfer and storage apparatus at spaced stations, but only one will now be described in detail.

*Discharge mechanism.*—Referring specifically to FIGS. 34, 35, 40 and 42, the stop or discharge mechanism 45 comprises the gate member 46 which includes a longitudinal upper plate 420 extending transversely of the master conveyor C and substantially parallel with the flights 20. R relatively narrow longitudinal lower plate 421 is pivotally mounted below the upper plate 420 by a plurality of one-way hinges 422, which permit the lower plate 421 to be moved away from a vertical position only in the direction of movement of the conveyor flights 20 and leaf springs 423 or the like normally maintain the lower plate 421 in the vertical position. The pivotal movement of the lower plate away from operative position is an anti-jam condition that will be described more fully hereinafter.

The ends of the upper plate 420 are provided with bifurcated guide members 424, FIGS. 34 and 35, each of which has spaced side plates 425 defining a vertical groove 425' in which a cooperating guide plate 426 is received, the guide plate 426 being rigidly secured to the conveyor frame 10 and maintains the gate member 46 in transversely extending position. Each guide plate 426 has a stop tab 427 secured thereto and one of the side plates 425 of each guide member 424 has a notch 428 formed therein to receive the tab 427. The notches 428 include upper and lower abutment surfaces 429 and 429' between which the tabs 427 move to limit vertical movement of the gate member 46. Accordingly, when the lower abutments 429 are contacted as in FIG. 35, the gate is in raised roll by-passing position and, when the upper abutments 429 are in contact with the tabs 427, the gate is in lowered roll stopping position with the lower margin 47 of the lower plate 421 below the level of the rolls R on a flight 20 but above the serrated surface 23' of the flights 20.

The gate member 46 is freely slidable relative to the guide plates 426 and is actuated by a conventional air operated cylinder 431 having a piston (not shown) adapted to be moved alternately between extended and retracted positions by air pressure on opposite sides thereof in the cylinder 431. In FIG. 40, it will be seen that the cylinder 431 has an intake port 432 for moving the piston and the piston rod 433 to extended position, and an intake port 432' for moving the piston and piston rod 433 to retracted position. The ports 432 and 432' are connected in a typical manner through a four-way valve (not shown) to a pressure source (not shown) and the valve may have solenoids 434 and 435, FIG. 44, for reversing the position of the valve armature so that the ports 432 and 432' will be alternately connected to the pressure source. Accordingly, when the solenoid 434 is energized, the piston rod 433 will be extended and, when the solenoid 435 is energized, the piston rod 433 will be retracted.

The piston rod 433 is pivotally connected to one leg 436 of a bell crank 437 and the other leg 438 is pivotally connected at 439 to the upper plate 420. The fulcrum of the bell crank 437 is pivotaed at 440 to a supporting member 441 rigidly secured to a cross frame member 442 of the conveyor frame 10. The supporting member 441 extends longitudinally of the master conveyor frame 10 and also supports the rearward end of the cylinder 431 on a pivotal connection 443.

It is now apparent that when the piston rod 433 is extended, FIG. 40, the bell crank 437 is rocked on the fixed pivot 440 to raise the arm 438 and position the gate member 46 in raised roll by-passing position, whereas when the piston rod 433 is retracted the gate member 46 is lowered to roll stopping position. In the lowered position, the lower plate 421 forms an abutment stopping the forward movement of a bank of rolls R on the next loaded conveyor flight 20 so that the flight passes beneath the lower margin 47 of the gate 46 and the rolls drop downwardly between conveyor flights 20 and onto the primary storage or shuttle 52.

As will be described under the electrical circuit for the discharge device D, the sensing mechanism 59 is provided as a portion of the gate actuation or timing means for operating the gate and comprises a switch having normally open contacts 444 and normally closed contacts 444', FIG. 44. A shoe 444'' is provided for actuating the switch 59, which is secured to the main conveyor frame 10, and the shoe 444'' is positioned to be contacted by each flight pin or trunnion 21 on one side of the conveyor. When the shoe 444'' contacts a pin 21, the normally open contacts 444 are made and the gate 45 will be lowered if the shuttle 52 is empty. The gate 45 is normally raised by a circuit through contacts 444', the position of the shoe 444'' being predetermined so that the gate will be lowered intermediate adjacent flights to prevent the breaking of rolls R.

The primary storage or shuttle 52, FIG. 43, is adapted to receive a bank of rolls R from the discharge position of the gate 46 and is in position to discharge the bank to the index chain or conveyor 48 upon demand. The storage shuttle 52 includes the superposed upper and lower plates 53 and 54 having openings 55 and 56 which are offset or mis-aligned in storage position so that the rolls R are maintained in spaced condition. The plates 53 and 54 are mounted on a support member 445 pivotally mounted at 446 to frame brackets 447 secured to the main conveyor frame 10, FIGS. 35, 40 and 43. The storage shuttle 52 is adapted to rock on the pivots 446 between a substantially horizontal loaded position and a canted unloaded or empty position, the shuttle support member 445 having a counter-balance weight 448 carried on a rod 449 for moving the shuttle to the latter position when rolls have been discharged to the index conveyor 48. However, the weight of a predetermined number of rolls is sufficient to move the shuttle 52 to its horizontal position. The end of the counter-balance rod 449 is positioned to close upper and lower micro-switches 450 and 451 when the storage shuttle 52 is in loaded and unloaded positions, respectively. The upper micro-switch 450 is in a circuit for energizing the solenoid 434 of air-cylinder 431 whereby the gate 46 is raised, and the lower micro-switch 451 is in the gate lowering circuit, both to be described more fully under the electrical circuit for the discharge device D.

The upper plate 53 of the storage shuttle 52 is secured to the support member 445, and the lower plate 54 is slidable in longitudinal grooves 452 in the support member whereby the lower plate is movable to a position with respect to the upper plate in which the openings 55 and 56 are aligned so that rolls R are discharged through the shuttle to the index chain 48. The lower plate 54 has an extended end portion 455 to which one end of a tension spring 456 is connected, and the other end of the spring is connected to an L-shaped arm 457 pivotally mounted on a plate extension 457′ of the support member 445. An upstanding lug 458 extends through an elongated slot in the plate extension 457′. An angle piece 460 is adjustably mounted by screws and slots 461 and 462 on the plate extension 457′ outwardly of the lug 458, and a compression spring 463 is positioned between the lug 458 and angle piece 460. An armature or plunger 464 of a solenoid 465 is secured to the lug 458 and is adapted to move lower plate 54 to a roll discharging position when the solenoid 465 is energized against the tension of spring 456. When the solenoid is de-energized, the tension spring 456 returns the lower plate to roll storing position. The force of the compression springs 463 is varied by adjusting the angle piece 460 whereby the speed of the lower plate movement can be regulated. In addition, the pivotal connection of the L-shaped member 457 coacts with the tension spring 456 and compression spring 463 on the return of the plate 54 to dampen vibration of the plate thereby increasing the speed of operation. The lower plate 54 is also provided with a friction device 466, FIG. 40, to act as a damper to shuttle movement whereby vibration is eliminated. Accordingly, when the lower plate is returned, the shuttle 52 is in roll storing condition almost instantaneously so that another drop from the master conveyor C can take place immediately.

The lug conveyor or index chain 48 is positioned beneath the storage shuttle 52 and is adapted to receive a bank of rolls R therefrom for transfer to a packaging machine P or the like. The conveyor 48 comprises a pair of spaced metal link sprocket chains 467 extending transversely of the main conveyor frame 10 or parallel with the gate 46 and shuttle 52, FIGS. 35, 40 and 41. Secured in spaced relation to the chains 467 are angle plates 468 including the lugs or partitions 49 which extend substantially normal to the chains, the lugs being spaced to define the divided chamber 50 adapted to receive the rolls R from the shuttle 52 and maintain the spaced relation thereof. The chamber 50 is also defined by baffle plates 471 and 472 extending parallel with the lug conveyor 48, the plates having outwardly diverging wall portions 473 and 474 for directing rolls R into the chamber and vertical abutment portions 473′ and 474′ for holding the rolls R in the index chain 49. The plate 471 is rigidly secured to a frame member 475 and the plate 472 is pivotally mounted as at 476 on the frame 475. The baffle plates 471 and 472 are also associated with a jam clearing mechanism to be described hereinafter.

The sprocket chains 467 extend around pairs of end sprocket wheels 469 and 420, which are adjusted to index the lugs 49 in vertically aligned position with the grill members 57 of the fixed upper shuttle plate 53 whereby rolls R discharged through the storage shuttle 52 will drop substantially directly into the compartments of the chamber 50. The sprocket wheels 469 are keyed to a shaft 478 journaled in bearings 479, and the sprocket wheels 470 are secured to shaft 480 journaled in bearings 481. As shown best in FIG. 35, the lug conveyor 48 is broken away to illustrate the wheels 469 and 470 may be spaced apart a sufficient distance to permit chain actuation with a bank of rolls R from an indexed position beneath the shuttle 52 to a position spaced to the left of that position. Accordingly, banks of rolls R may be received in the lug conveyors 48 before being discharged onto the transfer chute or conveyor 51.

Mechanically conditioned switch means 483 are provided to assure the proper functioning of the shuttle 52 and index chain 48. Referring to FIGS. 34, 40 and 41, the shaft 478 carries a worm gear 484 meshed with a worm wheel 485 rotatably supported on shaft 486 in bearing 487. A plate 488 having arcuate slots 489 is adjustably secured by screws 490 to the wheel 485. A plurality of spaced lobes 491 project above the surface of the plate 488 and serve as cams to set the switch means 483. A cam follower 492 is mounted on switch arm 492′ to be contacted by a lobe 491 during actuation of the index chain 48 whereby switch 483 is actuated to close a pair of contacts 483′ in the shuttle jam circuits to be described. The lower plate 54 of the shuttle 52 has an arm 493 which carries striker member 494 for striking the arm 492′ of the switch 483 for closing contacts 483″ and opening contacts 483′. The contacts 483″ are circuit conditioning means for energizing a relay in the index chain actuation circuit as will be described. The striker member 494 is not normally in contact with follower arm 492′ but by the action of spring 456, the lower plate 54 is permitted to return past its normal closed position relative to the upper plate 53 of the shuttle 52 to contact the arm 492′ and then returns to roll storing position.

*Drive mechanism.*—The drive mechanism for actuating the index chain 48 and the transfer mechanism 496 therefrom is shown best in FIGS. 38 and 39. A sprocket wheel 497 is secured on the shaft 480 and a sprocket chain 498 extends around wheel 497 and a sprocket 499 secured on shaft 500 journaled in bearings 501. An idler wheel 502 is pivoted on an offset arm 503 pivoted to a frame bearing 504. Another sprocket chain 505 extends around a wheel 506 secured on the shaft 500 and another sprocket wheel on one end of a shaft 508 journaled in bearings 509 and carrying a bevel gear 510 on its other end. The bevel gear 510 is meshed with a bevel gear 511 on drive rod 512, which extends to a suitable power source (not shown, but preferably the motor of the packaging machine P or other unit with which the discharge device D is associated). Another idler wheel 502 is mounted for cooperation with the chain 505 as previously described.

The sprocket chain and wheel 505 and 506 are continuously driven from drive rod 512 and a single revolution clutch 513 is provided for coupling the wheel 506 to shaft 500 when the index chain 48 is to be energized. The clutch 513 is actuated by a solenoid 514, FIG. 44. A plate 515 is also mounted on the shaft 500 and has an eccentric perimeter providing a step 516 against which a spring-loaded arm 517 abuts to act as a back-lash device whereby the chain 48 is kept indexed relative to the shuttle 52. The plate 515 also has a notch 518 in which a follower 519 of switch 520 is received, rotation of the plate 515 contacting the follower to close the switch 520 wherby a circuit to the packaging unit P is closed so that the unit P is actuated and drives belt 521 through sprocket chain and wheel 522 and 523. The belt 521 constitutes part of the transfer mechanism 496 for transferring rolls R from the index chain 48 to the packaging unit P.

*Transfer mechanism.*—It is apparent that the discharge device D provides a resereve storage of rolls R in the shuttle 52 and a first primary storage of rolls R in the index chain 48 beneath the shuttle 52. The index chain 48 is actuated laterally of the master conveyor only a predetermined distance sufficient to move the rolls R from the first primary storage position to an auxiliary or second primary position. It is from this second position that the rolls are discharged onto the transfer mechanism 496 and conveyed to the packaging machine P or other unit for further processing. A scraper or reject blade 525 is secured across the top of the index chain 48 at a predetermined angle, and has its lower edge 526 immediately adjacent to the rolls R. Rolls having unglued labels, loose ends or the like are thrown from the discharge conveyor upon striking the reject blade 525 thereby obviating downtime in the subsequent machine.

Referring to FIGS. 36 and 37, a dead plate 527 is rigidly secured between the index chain 48 and belt 521 to bridge the gap created by the curvature of these conveyor means around the respective wheels therefor. The rolls R are "fired" across the dead plate 527 and onto the belt 521 by the actuation of the index chain 48. The belt 521 is started into operation by the actuation of the chain 48, and moves at a rate of speed at least as high as the speed at which the rolls R are discharged from the index conveyor 48. Preferably, the belt 521 moves at a higher rate of speed to carry the rolls away from the chain 48 as rapidly as required by the packaging machine P to meet the production speed thereof and also to prevent abrasion of labels and the like.

The dead plate area of the transfer mechanism 496 has side walls 528 and a fixed top plate 529 with an upturned lip 529′ to assure smooth entry of the rolls therebelow. The plate 527 is slightly below the plane at which rolls are carried by the index chain to permit a slight drop as the rolls are transferred. Similarly, the plane of the belt 521 is below the plane of the plate 527.

The belt 521 extends in a channel having a lower plate 530 and side plates 531, the forward ends of the side plates 531 being turned outwardly as at 531′ to receive the rolls therebetween. The belt channel also includes a longitudinal hold-down guide 532 carried on stems 533 extending upwardly through the bar 532 having an upturned leading lip 532′. The guide 532 floats in the channel and exerts a pressure on the rolls to assure positive contact of the belt 521 with each of the rolls, and also to prevent endwise turning of the rolls. The top plate 529 above the dead plate 527 has spaced pressure members 535 extending therefrom longitudinally on each side of the bar 32 and a hold-down spring member 536 also extends toward the bar 532 but downwardly from the top plate 529 to act as a roll straightening device in combination with the pressure members 535.

A pair of micro-switches 537 and 538 are provided with elongated shoes 539 and 540, respectively. The shoes are cam means for closing the switches and are positioned in the transfer chute or channel. The micro-switch 537 is a demand or calling switch which is closed when the shoe 539 drops down by reason of the rolls R having passed the trailing end 539′ of the shoe 539. As will be described under the electrical circuit for the discharge device D, the demand switch 537 is in the index chain actuation circuit and rolls are only supplied to the packaging machine P when the demand switch completes this circuit. It is therefore apparent that operation of the index chain 48 depends on the absence of or need for the product as required by the next station in the processing of the product.

The micro-switch 538 is a shut-off switch in the circuit for running the packaging machine P so that when rolls pass under the trailing end 540′ of he shoe 540 and it drops down toward the belt 521, the switch shuts off the packaging machine P. In this manner, rolls R remain in the feed chute on the belt 521 ready to be fed into the machine when additional rolls are supplied by the discharge device. Accordingly, the packaging machine P never requires hand loading of rolls before it can be operated since a starved condition never occurs as the machine is always in loaded operating condition.

The rolls R are taken from belt 521 and fed into the machine by any suitable means usually provided as an integral part of the machine.

*Index chain jam clearing mechanism.*—Referring to FIGS. 40 and 45, jam conditions may result in the operation of the shuttle 52 by a roll being caught between the upper and lower plates 53 and 54 or the like. If such a jam is caused, the shuttle 52 will not return to roll storing position and the mechanical switch 483 will not be reset for index chain actuation. Means are provided for vibrating the shuttle 52 so that rolls will be cleared therefrom as will be described under the electrical circuit for the discharge device D. However, broken rolls, tablets, or other matter handled by the present apparatus is likely to fall into the chains 467 of the index conveyor 48 or in like manner cause serious trouble in the operation of the device, if not removed before beginning operation. Accordingly, jam clearing mechanism 542 is provided.

The baffle plate 472 is pivoted to the frame 475 by the pivot 476 for movement away from the index chain 48, a lever 543 being pivoted to plate 472 by pin 544. The lever 543 is connected to a piston rod 545 of an air cylinder 546, which is normally extending to maintain the baffle plate 472 in an upright channel-defining position. When a jam occurs the piston (not shown) in the cylinder 546 is retracted to actuate lever 543 and pull the baffle plate dowrwardly to open one side of the channel. The other baffle plate 471 is provided with a plurality of perforations 547 aligned with each compartment of the index chain 48 when in roll receiving position below the shuttle 52. An air jet 548 is positioned in each perforation to eject a stream of air across the index chain when the baffle plate 472 is lowered in a jam condition whereby all foreign matter is cleared from the index chain. The jets 548 and air cylinder 546 are provided in an air line 549 having a suitable valve (not shown) operated by solenoid 550.

It is now apparent that in the event of a jam occuring at the discharge device D, both the shuttle and the index chain are cleared of all rolls R or other foreign matter. The material blown from the index chain 48 is received on a suitable tray or bin (not shown).

*Gate jam mechanism.*—Referring to FIG. 42, the hinged lower portion 421 of the gate 46 is provided to prevent the jamming of the gate in the event the lower portion is struck by or strikes a rigid object, such as a loaded flight, a roll R jammed on a flight or other malfunction in the operation of the apparatus. The lower portion 421 will swing on hinges 422 against the biasing action of the springs 423 thereby preventing misalignment or breakage of the gate mechanism or the flights 20.

*Electrical circuit for discharge device.*—Referring now specifically to FIG. 44, the electrical circuit for the discharge device D includes relays 556 and 557 of the latch-pick, latch release type, and relays 558, 559, 560 and 561 which are solenoid actuated in one position but spring returned for normal operation when the solenoid is de-energized. The master relay 558′ (also called a jam and off relay) includes armature 562 biased by spring 563 to an operating position, and a release solenoid 564. The armature 562 carries transfer contact blades 565–568 adapted to be moved into and out of circuit closing position with fixed contacts 565′–568′ and contacts 567″ and 568″.

*Run-stop circuit.*—A main lead 569 is connected to ground and another main lead 520 is connected to switch blade 571′ of run-stop switch 571. A lead 573 is connected to solenoid 574 of the relay 561 and to one of normally open contact 575′ of the relay 561. The transfer blade 575 of relay 561 is normally biased to a closed position with contacts 575″ by spring 576. The other of contacts 575′ and one of contacts 575″ is connected by lead 577 to the release solenoid 564 of the jam and stop relay 558, the solenoid 564 being grounded. When switch 571 is in stop position, solenoid 574 of relay 561 is energized to complete a circuit through contacts 575′ and lead 577 to the release solenoid 564 so that the relay 558 is in inoperative condition. The relay 561 is also energized under jam conditions to be described later. It is apparent that as long as solenoid 574 is energized, solenoid 564 of the jam and stop relay 558 will also be energized but that the relays 558 and 561 will be returned to operative condition by springs 563 and 576 when the solenoids are de-energized.

When the blade 571′ of run-stop switch 571 is in "run" position, relay 561 will not be energized except under jam conditions occuring in the operation of the discharge device D. The "run" contact of switch 571 is connected by a lead 579 to a jam by-pass switch 580 to be described. Another lead 581 connects the main lead 570 through switch 571 to one of contacts 565′, the other contact 565′ being connected to lead 582. A lead 583 connects the lead 582 to one of a pair of contacts 584′ of the relay 556 and forms a portion of the shuttle circuit to be described. The lead 582 is also connected by leads 585 and 586 to switches 450 and 451, respectively, in the gate circuit to be described. Lead 587 connects lead 582 to the calling switch 537 in the index chain circuit. Leads 588 and 589 connect the lead 582 to the contacts 483′ of the mechanical switch 483 and to one of contacts 590′ of the relay 559 to form part of the jam circuit.

*Gate actuation circuit.*—The circuit for lowering the gate 46 includes the switch 451 having transfer blade 592 moved from an open position when the shuttle 52 is loaded with a bank of rolls R to a closed position with contact 592′ when the shuttle 52 is unloaded. As previously described, the switch 451 is actuated by the counter-weight 448 associated with the shuttle 52. The contact 592′ is connected by lead 593 to one of normally open contacts 444 of the flight sensing switch 59. These contacts 444 are closed as each flight 20 passes the shoe 444″ and the position of the shoe 444″ assures the lowering of the gate 46 intermediate adjacent flights. The other contact 444 is connected to one of contacts 566′ by lead 594, the contacts 566′ being normally closed by transfer blade 566 through the action of the spring 563 during operation of the discharge device D. The other of the contacts 566′ is connected by lead 595 to one side of the gate lower solenoid 435 and the other side of the solenoid is grounded. Energization of the solenoid 435 reverses a four-way valve (not shown) to actuate the cylinder 431 to lower the gate 46. It is apparent that, in order to lower the gate 46 to discharge a bank of rolls R onto the shuttle 52, the shuttle must be unloaded and the flight sensing switch 59 actuated by shoe 444″ contacting a flight pin 21. The actuation will take place at the precise instant the contacts 444 are closed after the shuttle 52 is emptied, and the time required for a loaded flight 20 to move to a point at which the lowered gate 46 will arrest the movement of a bank of rolls so that it drops downwardly between flights onto the shuttle 52 is a sufficient length of time for the lower plate 54 of the shuttle to return to roll storing position.

The gate raising circuit includes the switch 450 having a transfer blade 597 movable from an open position when the shuttle 52 is unloaded to a closed position with contact 597′ when the shuttle 52 has a bank of rolls R thereon. The contact 597′ is connected by lead 598 to one of the normally closed contacts 444′ of flight sensing switch 59 and the other contact 444′ is connected by a lead 599 to one of contacts 567′ of relay 558. The contacts 567′ are closed during normal operation of the discharge device D, and the other contact 567′ is connected by lead 600 to the gate raise solenoid 434.

It is now apparent that the gate 46 will be lowered when the shuttle 52 is empty by the energization of solenoid 435, and the gate will be raised by energizing solenoid 434 when the shuttle 52 is loaded. The cylinder 431 for operating the gate will remain in either actuated or retracted condition when the proper solenoid has been energized until the other solenoid is energized to reverse the four-way valve control for the cylinder. Accordingly, when the gate 46 is lowered, it will remain down until a loaded flight 20 passes under the gate and rolls R are discharged onto the shuttle 52. The gate 46 can only be energized by the circuit described, but may be raised under jam conditions to be described hereinafter.

*Shuttle actuation circuit.*—The actuation of the lower plate 54 to an aligned position with the upper plate 53 to discharge a bank of rolls R into the index chain 48 requires that the transfer blade 597 of switch 450 be in closed position with the contact 597′. A lead 601 connects the contact 597′ to one of a pair of contacts 602′ normally closed by transfer blade 602 of relay 559 by the action of spring 603 on armature 604. The other contact 602′ is connected by lead 605 to timer 606 which opens switch blade 607 from contact 607′ for a predetermined interval and closes the switch blade 607 to complete a circuit from the lead 605 through a lead 608 to the latch-pick solenoid 609 of relay 556. The timer 606 permits rolls R to settle on the shuttle 52 before being dropped into the index chain 48 and also assures that the index chain movement is complete from the previous actuation. The relay 556 also includes the blade 584 carried by armature 610, and a release solenoid 611. When the relay 556 is released, the contacts 584′ are open when the solenoid 609 is energized to latch up armature 610, a circuit is completed from the run lead 582 through the lead 583 and the contacts 584′. The other contact 584′ is connected by lead 612 to one of the contacts 568′, the other of which is connected to the shuttle solenoid 465 by lead 613. In operation, when rolls R are discharged onto the shuttle 450 to establish a circuit through leads 601 and 605 and relay contacts 602′ to the timer 606 which opens switch 607 for a brief interval and then closes it to establish a circuit for energizing the solenoid 609. The contacts 584′ of relay 556 are thus maintained in closed position to make a circuit to the shuttle solenoid 465. As soon as the shuttle opens and the rolls R are discharged into the divided compartment of the index chain 48, the counter-weight 448 opens switch 450 and closes switch 451, the latter also being connected by lead 614 to the release solenoid 611 of the relay 556 whereby the shuttle solenoid 565 is de-energized by the opening of relay contacts 584′. Accordingly, the shuttle 52 is returned to roll storing position by return spring 456 and conditions the index chain circuit for operation.

*Index chain circuit.*—The return of the lower plate 54 of the shuttle 52 to roll storing or receiving position sets the mechanical switch 483 as previously described to close contacts 483″. Accordingly, a circuit is established through leads 582 and 488 to one of these contacts, and the other contact 483″ is connected by lead 615 to solenoid 616 of the relay 559. The relay 559 has normally closed contacts 590′, 602′ and 617′ and normally open contacts 618′, the armature 604 carrying transfer blades 617 and 618 for closing the sets of contacts 617′ and 618′. When the solenoid 616 is energized, the contacts 590′, 602′ and 617′ are opened and contacts 618′ are closed. One of contacts 618′ is connected by leads 619 to contact 620′ of calling switch 537 to be closed by transfer blade 620, and the other contact 618′ is connected by lead 621 to the index chain solenoid 514 for energizing the clutch 513 to actuate the index chain 48. When the rolls R on the belt 521 in the transfer mechanism 496 pass under shoe 539 so that the calling switch 537 is closed, the circuit to the index chain solenoid 514 is completed and the index chain 48 will be actuated to deliver a bank of rolls onto the belt 521. The switch 537 is opened until rolls are again required by the packaging machine P. In the event no rolls have been dropped into the index chain 48 from the shuttle 52, the relay 559 will not be energized by solenoid 616 to complete the index chain inasmuch as the switch contacts 483″ are not closed by shuttle return. The calling switch 537 will remain in closed position until the index chain is provided with rolls. In the event rolls pass under the shoe 540 of the standby or shut-off switch 538, the packaging unit P will cease operation immediately until rolls are again provided thereby preventing the occurrence of a starved condition.

When the demand or calling switch 537 has closed the circuit and as soon as the index chain 48 is actuated, the lobes 491 contact the follower 492 to reset the switch 483 for operation. The circuit through the contacts 483″ to relay solenoid 616 are opened so that spring 603 returns the relay 559 to operative position thereby opening the index chain circuit through contacts 618′. The contacts 602″ in the shuttle circuit are thus closed and the shuttle is conditioned for operation when the counter-balance switch 450 is closed and the switch 607 is closed by the timer 607. Inasmuch as the switch 450 may be closed when the chain 48 is actuated and the relay 559 is reset almost instantaneously, the timer 606 permits the index chain to stop before rolls are discharged thereto.

In the "stop" position of the switch 571, switches 623 and 624 are provided for manually energizing the shuttle solenoid 465 and the index chain solenoid 514 if it is desired to manually operate the discharge device D. The switch 623 is interposed in lead 625 between leads 573 and 613, and switch 624 is interposed in lead 626 between leads 625 and 621.

The relays 557 and 560 will be briefly described before describing the jam circuits. The relay 557 includes a latch-pick solenoid 628, a release solenoid 629 and an armature 630 carrying transfer blade 631 for closing a normally open pair of contacts 631′. The relay 560 includes a solenoid 632, an armature 633 and a spring 634, the armature carrying transfer blade 635 normally biased to a closed position with contacts 636, by the spring 634. The blade 635 is movable to close normally open contacts 636′ by energization of the solenoid 632.

*Jam circuit.*—The jam circuit is associated with the shuttle 52 to immediately stop operation of the discharge device D if a jammed condition results, and to put into operation the jam clearing mechanism. A jam conditioning circuit is operative each time the shuttle is actuated and the rolls R are discharged into the index chain 48. A lead 638 is connected to the lead 614 which is connected to the lower counter-balance switch 451 to complete a circuit from the lead 582 to solenoid 611 of the relay 556 thereby opening the circuit to the shuttle solenoid 465. Simultaneously, a circuit is completed through the lead 638 to a timer 639 which moves switch blade 640 to an open position from its contact 640′ after a predetermined time. The switch blade 640 is also connected to lead 638, and the contact 640′ is connected by lead 641 to one of normally closed contacts 636 of the relay 560. When current in the circuit to the timer 639 is lost, the switch blade 640 is spring returned to a normally closed position with contact 640′.

A lead 642 connects the other contact 636 of relay 560 with one of normally closed contacts 643′ of the jam by-pass switch 580, the contacts being closed by transfer blade 643 and the other contact 643′ being connected by lead 644 to latch-pick solenoid 628 of the relay 557. The relay 557 is thus latched-up each time the shuttle is actuated, and the timer 639 opens the circuit when the relay 557 is set so that the release solenoid 629 thereof will be operative when a circuit thereto is completed. The release solenoid 629 is ordinarily energized by a circuit through lead 645 to the lead 615 and contacts 483′ of switch 483, which contacts are closed by the return of the shuttle 52.

The jam circuit includes thet contacts 631′ which are closed by blade 631 when the relay 557 is latched up. One of contacts 631′ is connected by lead 646 to one of the contacts 483′, the contacts 483′ being closed when the index chain 48 is actuated and until the shuttle return resets the switch 483 to close the other set of contacts 483″. The other of the contacts 483′ is connected by lead 647 to one of normally closed contacts 617′ of relay 559, the other of these contacts being connected by lead 648 to lead 579 to the "run" contact of switch 571. It is now apparent that when the shuttle 52 is actuated a jam circuit is completed through contacts 617′ of relay 559, lead 647, contacts 483′ of switch 483 and lead 646 to the one contact 431 of the relay 557. The other contact 631′ is connected by lead 649 to a jam timer 650 and by lead 651 to switch blade 652 of switch 653. The switch 653 is normally open, and timer 650 provides a predetermined interval for the normal return of the shuttle 52 to roll storing position before closing the switch blade 652 with its contact 652′ to close the jam circuit.

Accordingly, in normal operation the release solenoid 629 of relay 557 is energized to open the jam circuit and stop the timer 650 by the return of the lower plate 54 of the shuttle 52, the solenoid 629 being energized through contacts 483″ of switch 483 and the jam circuit also being opened at contacts 483′ of switch 483. However, if a jam condition should occur so that the shuttle 52 remains open or partially open and switch 483 is not reset, the jam timer 650 completes the circuit to stop the operation of the discharge device D. The contact 652′ is connected by lead 655 to one of the normally closed contacts 575″ of the relay 561, the other of contacts 575″ being connected by the lead 577 to the solenoid 564 of the jam and stop relay 558. Accordingly, contacts 565′, 566′, 567′ and 568′ are opened to stop the normal operation of the device, and contacts 567″ and 568″ are closed. One of contacts 567″ is connected by lead 656 to lead 655, and the other contact 567″ is connected by lead 657 to the gate raise solenoid 434 whereby the gate 46 will be raised in any jam condition which occurs. The opening of the other contacts of the relay 558 breaks circuits to the shuttle and index chain actuation circuits.

*Jam by-pass circuit.*—The jam may be cleared manually for operation when the main switch 571 is in "stop" position. The jam by-pass switch 580 has a set of normally open contacts 658′ adapted to be closed manually by transfer blade 658 and the blade 643 in the circuit to the solenoid 628 of relay 557 is simultaneously opened. One of contacts 658′ is connected by lead 659 to the lead 645 to the release solenoid 629 and also through the lead 615 to the solenoid 616 of relay 559. Therefore, the jam circuit is opened by energizing the solenoid 629 and the index chain circuit is conditioned for operation by energizing the solenoid 616. Actuation of the index chain 48 assures that switch 438 is set for shuttle operation when a bank of rolls R is dropped thereon.

*Jam clearing circuit.*—The automatic jam clearing circuit for the discharge device D is similar to the circuit for the loading device L previously described. The jam clearing circuit is provided to automatically open and close the shuttle 52 and to simultaneously operate the jam clearing mechanism 542 of the index chain 48 so that rolls R jammed in the shuttle or dropped in the index chain 48 will be removed so that normal operation can promptly resume.

The lead 613 to the shuttle solenoid 465 is connected by lead 661 to one of the contacts 568″ of relay 558 which contacts are closed by blade 568 when a jam occurs. The other contact 568″ is connected by lead 662 to a vibrator contact 663′ adapted to be opened and closed with another vibrator contact 663′ by the vibrator wheel 663 driven by motor 664. The other vibrator contact 663′ and the motor 664 are connected by lead 665 to a normally closed contact 666′ of a switch 666, which has a switch blade 667 movable between the contact 666′ and a normally open contact 667′. A timer 668 is connected to the switch blade 667 for moving it to the closed position with contact 667′ after a predetermined interval. The timer 668 and the blade 667 are connected by lead 669 to the lead 655 from the jam timer 650. Accordingly, when a jam circuit is established, the circuit through switch 666 to the vibrator motor 664 is immediately completed so that the vibrator wheel 663 will cause contacts 663′ to alternately open and close to make and break a circuit through lead 662, contacts 568″ of relay 558, and leads 661 and 613 to the shuttle solenoid 465. The normally closed contact 666′ is also connected by lead 670 to the air valve solenoid 550 of the jam clearing mechanism 542 for opening baffle wall 472 and blowing air across the index chain 48.

The timer 668 is started on its timing period simultaneously with the operation of the vibrator device, and when it has timed out, the vibrator circuit is opened by moving blade 667 of switch 666 to closed position with the contact 667′. This contact is connected by lead 671 to the solenoid 632 of the relay 560 whereby the armature 633 is actuated to open the contacts 636 and move the transfer blade 635 into closed contact with the contacts 636'. One of contacts 636' is connected by lead 672 to one of normally closed contacts 590' of the relay 559, the other of which is connected by the lead 489 to the run lead 582. The other contact 590' is connected by lead 673 to the leads 615 and 645 connected to the solenoids 616 and 629 of relays 559 and 557, respectively. Therefore, when the timer 668 has timed out, the circuit is completed to the solenoid 616 to complete the index chain actuation circuit and to the solenoid 629 to release relay 557 and open the jam circuit. When the jam circuit is cleared, the solenoid 564 of the jam and stop relay 558 is de-energized whereby normal operation of the discharge device D can resume.

*Operation*

In order to fill the product demand of any package machine P at any operating speed to meet continuous production requirements, the product must be available in the transfer chute 51 under the shoe 540 of the shutdown switch 538 at all times. Of course, if continuous production is not required intermittent starting and stopping of the packaging machine P may occur. However, maximum production will be considered as the apparatus can always meet smaller production requirements.

The speed at which rolls R are discharged from the index chain 48 is a rate that will feed the rolls under the shoes 539 and 540 of the switches 537 and 538 before the last roll on the belt 521 passing from under the shoe 539 of the demand switch 537 reaches the trailing end of the shoe 540. The reaction time of the discharge device D is also predetermined so that rolls are transferred from a flight 20 to the index chain 48 in less time than a bank of rolls are used at the packaging machine P. Maximum speed of operation is obtained by maintaining the shuttle 52 and both reserve stations of the index chain 48 in loaded condition, but if empty flights 20 pass under the gate 46 so that the three reserve banks of rolls are taken by the packaging unit a transfer can still be made from a flight 20 into the transfer mechanism 496 to keep the line operating and the reserve can be built up again provided loaded flights are available.

As previously stated, the present apparatus handles a plurality of products as a single unit whereas the packaging machine handles single products or small multiples thereof. Accordingly, the large multiple unit or bank of products stored, transferred and supplied to the packaging line facilitates operation of the latter at speeds far in excess of the speed of the master conveyor C. It is also apparent that the handling of a multiple product unit by the apparatus permits the intermittent feeding of a continuously operating machine. The loading device L operates on the same principle and the intermittent production of single rolls or like articles is converted into a multiple product unit transferred through the loading device L to the flights. The loading device L has a double storage or reserve capacity to assure the filling of all flights 20. The length of the flights or number of single articles in the multiple unit handled by the present apparatus may vary to meet production requirements.

The speed of the master conveyor C may be varied to bring loaded flights more rapidly to the discharge device D and thereby increase production. The maximum speed of the master conveyor C in the present embodiment is the speed at which rolls discharged by gate 46 to the shuttle 52 of the discharge device are struck by the following flight. The minimum speed is approximately the speed at which rolls discharged would topple from the flight during discharge rather than being pushed from the flight.

The speed of the packaging machine P determines the rate of speed of the conveyor as more discharges in a given time will be required to meet a given output so that more flights past the discharge gate in that given time are needed. The loading devices L and roll wrapping machines W may produce and store rolls at a variable rate also, however, it is generally necessary to employ several wrapping machines W to maintain all of the conveyor flights 20 in loaded condition. The number of machines supplying rolls is determined by comparing the roll production per machine with the maximum production speed of the conveyor C, the number of flights past the loading station in a given length of time and the number of rolls comprising the multiple product unit carried by each flight. Standby machines should also be provided.

The pusher bar mechanism 35 or 35' for discharging rolls onto the flights is driven by the master conveyor C as is the roll aligner mechanism 40, and therefore increased speed of operation of these devices is obtained when the conveyor speed is advanced.

It is apparent that a plurality of packaging lines may be desired and the conveyor speed will have to be increased to supply a larger number of products to the several lines. The present apparatus is adapted to be automatically operated and programmed by a computor (not shown). The computor programming would provide advanced or retarded speeds of all components to obtain optimum operation, and would permit priorities to be established at selected discharge lines.

The present apparatus and mechanisms, devices and sub-assemblies have been disclosed only by way of illustration and example, and changes and modifications therein will be readily apparent to all skilled in the art. Accordingly, the only limitation in the scope of the present invention is by the claims which follow.

What we claim is:

1. A system for transferring and storing products from first processing means to meet the production requirements of second processing means, comprising a storage conveyor having a plurality of load carriers for products, first processing means including at least two transfer devices for selectively placing products on all of the load carriers of said storage conveyor, and second processing means including a second transfer device responsive to an unloaded product condition thereof for removing products from load carriers of said conveyor.

2. In a system for supplying products to a plurality of spaced processing stations, the combination comprising continuously movable endless conveyor means having a plurality of spaced load carriers each of which is adapted to carry a plurality of individual products, means for selectively loading products on said load carriers, and discharge means for each of said processing stations having storage means loaded from said conveyor means in response to an unloaded condition thereof, and means for advancing the speed of said conveyor means as increased demand for product is made by said processing stations.

3. A product storing and transferring system comprising an endless storage conveyor having a longitudinal path, a plurality of product carriers on said storage conveyor, first and second stations on said longitudinal path loading products on said carriers and discharging products from said carriers, said storage conveyor being movable at a variable rate to move a predetermined number of carriers to said second station in a predetermined time interval, products on some of said carriers being selectively discharged therefrom at said second station, products remaining on other of said carriers being recycled by said storage conveyor, and said first station loading products on selected carriers from which products have been discharged.

4. A system for transferring and storing products, comprising a storage conveyor having a plurality of load carriers for products, a plurality of loading devices forming a loading station adjacent to said storage conveyor, first processing means intermittently moving single products to each of said loading devices, each of said loading devices having an auxiliary storage for a multiple product unit formed of a plurality of single products, and means for selectively transferring multiple product units from said auxiliary storage of said loading devices to empty load carriers of said storage conveyor, whereby all of the load carriers leaving said loading station are provided with a multiple product unit thereon, at least two discharge devices forming a discharge station adjacent to said storage conveyor for selectively removing multiple product units therefrom, and second processing means adapted to receive multiple product units from each of said discharge devices as needed for normal continuous operation of said second processing means, which multiple product units are normally available at said discharge devices.

5. A system for transferring and storing products, comprising a continuously moving storage conveyor having a plurality of load carriers each adapted to carry a multiple product unit formed of a plurality of single products, a plurality of loading devices to which single products are intermittently conveyed from a first processing station, each of said loading devices forming and selectively transferring multiple product units to empty load carriers of said storage conveyor, at least two discharge devices selectively removing multiple product units from said storage conveyor, each of said discharge devices having an auxiliary storage for a multiple product unit, and means for intermittently conveying multiple product units from said discharge devices to second processing means responsive to a demand signal from the latter.

6. A transfer and storage system comprising a continuously moving storage conveyor having a plurality of spaced flights each adapted to carry a multiple product unit formed of a plurality of single products; a plurality of loading devices each of which is adapted to receive spaced single products on an intermittently actuated first conveyor from a first processing station, each of said loading devices having a primary storage to which a plurality of single products are simultaneously discharged from said first conveyor to form the multiple product unit, means for discharging products to said primary storage during the dwell time between intermittent movements of said first conveyor and in response to means indicating an unloaded condition of said primary storage, and means for discharging a multiple product unit from said primary storage to an unloaded flight of said storage conveyor in timed relationship with the movement of said flight; a plurality of discharge devices each of which has an auxiliary storage adapted to receive a multiple product unit in response to means indicating an unloaded condition thereof, an intermittently actuated second conveyor for transferring a multiple product unit from each discharge device to a second processing station, means for discharging a multiple product unit from said auxiliary storage to a first storage position of said second conveyor when said second conveyor is at rest and said first storage position thereof is in unloaded condition, said conveyor having a second storage position spaced laterally from said first storage position thereof, and switch means responsive to an unloaded condition of said second processing station for actuating said second conveyor.

7. Transfer and storage apparatus comprising an endless master storage conveyor having spaced product carrying means, first means for selectively loading a plurality of products on said product carrying means under surge conditions, second means for removing a plurality of products from some of said product carrying means, each of said first and second means including an intermediate storage for a plurality of products, the products not removed by said second means being recycled by said master storage conveyor and means responsive to the presence and absence of products for automatically operating said first, second and master storage conveyor.

8. Transfer and storage mechanism for transferring a plurality of spaced products from a first conveyor to a second conveyor, comprising gate means positioned adjacent to the first conveyor, electro-responsive means adapted to move said gate means relative to said first conveyor between a first position discharging said plurality of products from the first conveyor and a second position in which said plurality of products are retained on said first conveyor, storage means positioned below said gate means to simultaneously receive said plurality of products therefrom when said gate means is in first position, means responsive to the absence of products on said storage means for conditioning said electro-responsive means to move said gate means between the first and second positions thereof, and means for discharging said plurality of products from said storage means to the second conveyor in response to means indicating an unloaded condition of the second conveyor.

9. Transfer and storage mechanism for transferring a plurality of spaced products from a first conveyor to a second conveyor, comprising gate means positioned adjacent to the first conveyor, electro-responsive means adapted to move said gate means between a product contacting position and a product passing position, storage means below said gate means for receiving said plurality of products therefrom and including counter-balance means, switch means actuated by said counter-balance means for conditioning said electro-responsive means to move said gate means from one of its positions to another of its positions, and means for discharging said plurality of products from said storage means to the second conveyor in response to means indicating an unloaded condition of the second conveyor.

10. Transfer and storage mechanism for simultaneously transferring a plurality of spaced products from a first conveyor to a second conveyor, comprising gate means positioned adjacent to the first conveyor, electro-responsive means adapted to move said gate means relative to said first conveyor between a first position discharging products from said first conveyor and a second position in which products are retained on said first conveyor, storage means positioned below said gate means for receiving the plurality of products therefrom and storing the products in spaced relation, switch means responsive to the absence of stored products on said storage means for conditioning said electro-responsive means to move said gate means from the second position to the first position thereof, second switch means indicating an unloaded condition of the second conveyor, and means for discharging the stored products to the second conveyor in spaced relation thereon.

11. Transfer and storage apparatus for moving products between first and second stations, comprising first conveyor means including load carriers for a plurality of products; first transfer means adapted to transfer products from a first station to said first conveyor means and including a first product storage, a second conveyor for carrying products to said first product storage from the first station, a second product storage positioned intermediate said first product storage and said first conveyor means, means for discharging products from said first to said second product storage, and means for transferring products from said second product storage to said first conveyor means; and second transfer means adapted to transfer products from said first conveyor means to a second station and including a third product storage, means for discharging products from said first conveyor means to said third product storage, a third conveyor adapted to receive products from said third product storage, and means for actuating said third conveyor to carry products to the second station.

12. Transfer and storage apparatus for moving products between first and second stations, comprising master conveyor means including a plurality of spaced flights each of which is adapted to carry a plurality of individual products, an endless chain to which each of said flights is freely pivotally connected, drive means for moving said chain in a closed path; loading means adapted to transfer products from a first station to selected flights on said master conveyor means and including a loading station spaced above said master conveyor means and substantially parallel with the flights thereof, a loading conveyor for carrying products to said loading station from the first station, loading station storage means positioned intermediate said loading station and the flights on said master conveyor means, means for discharging products from said loading station to said loading station storage means in response to an unloaded condition of the latter, and means for transferring products from said loading station storage means to a selected unloaded flight of said master conveyor means; and discharge means adapted to transfer products from the flights of said master conveyor means to a second station and including gate means movable between product stopping and product by-passing positions, discharge station storage means positioned beneath said gate means to receive products from one of the flights of said master conveyor means when said gate is in product stopping position, said gate means being movable to product stopping position in response to an unloaded condition of said discharge station storage means, a discharge conveyor positioned beneath said discharge station storage means, means for transferring products from the discharge station storage means to the discharge conveyor, and means for actuating said discharge conveyor to carry products to the second station.

13. Transfer and storage apparatus for moving products between processing stations during the manufacture thereof, comprising master storage means including a longitudinal conveyor to which a plurality of spaced transverse parallel flights are pivotally connected, each of said flights being adapted to support and carry a row of individual products in spaced relation, means for actuating said conveyor to move said flights longitudinally in an upper horizontal path; a loading device adapted to transfer a row of spaced products from a first processing station to selected flights on said conveyor and including a loading conveyor for intermittently moving spaced products from the first processing station, a portion of the loading conveyor defining a storage chamber for a row of spaced products, a primary storage rack positioned below said chamber and above the flights on said conveyor, means for discharging a row of spaced products from said chamber to said primary storage, and other means for selectively transferring a row of spaced products from said primary storage to an unloaded flight of said conveyor; means for aligning spaced products on the flights of said conveyor; and a discharge device adapted to selectively transfer a row of spaced products from a flight of said conveyor to a second processing station and including stop means movable between product stopping position and a product by-passing position, a primary storage positioned beneath said stop means for receiving a row of spaced products from one of the flights of said conveyor when said stop means is in product stopping position, and a discharge conveyor positioned beneath said primary storage, means for discharging a row of spaced products from the primary storage to the discharge conveyor, and means for actuating said discharge conveyor to carry products to the second processing station.

14. In an apparatus of the type described, a continuous conveyor comprising a plurality of spaced flights each of which is pivotally mounted for independent swinging movement, each flight having a serrated upper surface defining a plurality of product receiving depressions spaced transversely relative to the direction of conveyor movement, abutment means above the depressions at the leading end thereof, and means moving said conveyor in a closed path having upper and lower paths of movement, the upper surface being carried in an upper position to hold products thereon in both the upper and lower paths of movement.

15. In combination with a conveyor having a plurality of transverse flights in predetermined longitudinally spaced relation, each of the flights being adapted to carry a plurality of transversely spaced articles in a longitudinal path between first and second stations, aligning means comprising an elongated contact member extending transversely of said conveyor in substantial parallelism with said flights, said contact member having spaced surfaces in longitudinal alignment with the article carrying positions of said flights, and intermittent drive means for moving said contact member into a predetermined relationship with each flight for orienting articles thereon during movement of the flight by said conveyor.

16. In combination with a conveyor having spaced flights continuously moved in a longitudinal path, each flight being adapted to carry transversely spaced products, aligning means adapted to be moved intermittently relative to each flight at a speed faster than the speed of the conveyor into a product aligning position, drive means coupled to said conveyor and driven continuously thereby, and segmented gear and cam means coupled between said drive means and said aligning means for translating the continuous motion of the former to the intermittent motion of the latter.

17. A product aligning device for straightening spaced products on each of a plurality of spaced load carriers of a continuously moving conveyor, comprising a pair of elongated contact members each having spaced product contacting surfaces, said members being spaced apart on drive means for alternately moving the members in an upper product straightening path and a lower return path, said drive means having a driven connection with a segmented gear and cam, another gear and cam having a continuous drive and being adapted to engage said segmented gear and cam to provide an intermittent drive to said members.

18. In combination with a conveyor having a pivotally-mounted load carrier including an upper surface for carrying a product and a product handling station associated with the conveyor for handling a product to be carried by the load carrier, stabilizing means comprising a yieldably mounted elongated member adapted to contact said load carrier at the product handling station for preventing pivotal movement of the load carrier only during a product handling operation.

19. In a transfer and storage apparatus having loading and discharge stations and a product conveyor moving relative to said stations, said conveyor including a plurality of spaced flights each having a product carrying surface and being mounted on pivot pins for free swinging movement, stabilizing means for said load carriers at each of said stations, said stabilizing means comprising an elongated spring-biased shoe adapted to contact and exert a constant pressure on a plurality of load carriers in a plane substantially parallel with the plane of said product carrying surfaces when in position to have loading and discharge operations performed by said loading and discharge stations.

20. In combination with a conveyor forming a master storage for a plurality of articles and having spaced article carrying members, a loading device for selectively transferring articles to said conveyor members comprising a storage shelf adapted to receive and store an article in position to be transferred to a conveyor member, and means movable in the direction of conveyor movement and in timed relation therewith in response to an unloaded condition of a conveyor member for sliding an article from the storage shelf onto said unloaded conveyor member.

21. A loading mechanism for transferring a plurality of spaced products to a preselected conveyor area moving relative thereto, comprising a first storage for a plurality of products, a second storage for a plurality of products, first means for discharging products from the first storage to the second storage, and second means for discharging products from said second storage to a preselected area of a moving conveyor, said first means including solenoid actuated gates having a circuit including a switch closed by the presence of a product on the first storage and a switch closed by said second storage when unloaded, and said second means including a pusher bar having an actuation circuit including a sensing switch selecting the area of the conveyor to receive products and a switch closed by said secondary storage when loaded.

22. In combination with a continuously moving conveyor having a plurality of article carrying areas, a loading device comprising storage means for supporting an article above said conveyor, sensing means for determining an unloaded condition of each article carrying area, and means responsive to said sensing means and an article on said storage means for discharging the article onto an unloaded carrying area.

23. In a combination with a product conveyor having a plurality of flights at equidistant spaced points therealong, and devices for selectively loading and unloading products on said flights, a sensing mechanism for determining the loaded and unloaded condition of each flight, said sensing mechanism comprising a contact member, cam controlled means reciprocating said contact member between adjacent and remote positions relative to said flights, drive means for rotating said cam to provide timed operation of said contact member toward each of said flights, and electro-responsive means controlled by said sensing mechanism for rendering said one device operative and inoperative in response to the unloaded and loaded conditions, respectively, of a flight of said conveyor.

24. In combination with a device for storing products and a conveyor having spaced product carriers, means for transferring products from the device to a product carrier, said transferring means comprising a contact member normally retracted from the product storing position of the device, means for actuating said contact member to an advanced position traversing the product storing position of the device, and means for operating said actuating means in response to the presence of a product on the product storing position of the device and the absence of a product on a product carrier of the conveyor.

25. In combination with a device for storing products and a conveyor having spaced product carriers, means for transferring products from the device to a product carrier comprising a contact member normally retracted from the product storing position of the device, mechanical means for reciprocating the contact member to an advanced position traversing the product storing position of the device and back to retracted position, and electro-responsive means for operating said mechanical means in response to the completion of a series circuit having a product carrier selecting switch and a product indicating switch closed by the presence of product in the product storing position of the device.

26. The transferring means according to claim 25 in which the circuit is closed only after a predetermined interval after the product indicating switch is closed.

27. In a device of the type described, reciprocably mounted means actuated in response to presence of product in product storing position of a device and absence of products on a product carrier for transferring product from the former to the latter, said means comprising first and second contact bars spaced apart by yieldable means, each of said bars having an arm fixedly connected thereto, said arms being pivotally mounted at spaced points to a plate, a switch normally spaced from said plate, relative movement of said contact bars toward each other being adapted to pivot said plate to close said switch, and said switch being in a circuit for stopping the operation of the device when said switch is closed.

28. In a device having solenoid operated means movable between product storing and product discharging positions, electrical means for indicating a product jam of the device and vibrator means for alternately energizing and de-energizing the solenoid of said first mentioned means to clear the product jam.

29. A jam clearing mechanism for cleaning a product handling device in response to a product handling malfunction, comprising jam indicating means stopping normal operation of said device, and air means for blowing a stream of air into said device to remove and clear all product and foreign matter therefrom.

30. A loading device having a product storing chamber and a normally closed gate for retaining products in the chamber, a first solenoid adapted to be energized to move said gate to an open position for discharging a product from said chamber, a second solenoid for normally maintaining said gate in closed position, switch means responsive to a product jam for opening a normal circuit to said solenoids, and a jam clearing circuit for alternately energizing said solenoids to clear the product jam and for restoring said normal circuit to operative condition.

31. In a device of the type described having a shuttle through which a product is discharged onto a conveyor, jam indicating means stopping normal operation of said shuttle and conveyor, vibrator means intermittently opening and closing said shuttle, and means for cleaning said conveyor.

32. A discharge device having a product storing shuttle mechanism including a movable plate, a solenoid for moving said plate to a product discharging position, spring means returning said plate to product storing position, switch means adapted to be set by said plate returning to product storing position, and jam clearing means for intermittently energizing said solenoid when said plate does not return to product storing position within a predetermined time after movement to product discharging position.

33. In combination with a conveyor having spaced article carrying members forming a master storage for articles, a discharge device comprising storage means for supporting an article below said conveyor, switch means closed by an unloaded condition of said storage means, abutment means conditioned for operation by the closing of said switch means for moving to a position for discharging articles from a conveyor member to said storage means, and phasing means operating said abutment means intermediate adjacent conveyor members.

34. A discharge mechanism comprising a stop member movable vertically between product by-passing and product stopping positions relative to a continuously moving conveyor having spaced flights each carrying a plurality of products, a first storage for a plurality of products, a second storage for a plurality of products, first means for actuating said stop member to discharge products from a flight to said first storage, second means for discharging products from said first storage to said second storage, and third means for discharging products from said second storage to a discharge line, said first means including a circuit having a switch closed by the absence of products on said first storage and a timing switch for actuating said stop member at a predetermined time, said second means including a circuit having a switch closed by the presence of products on said first storage and relay contacts closed by the actuation of said third means so that said second storage is unloaded, and said third means including a switch closed by the actuation of said second means and a switch closed by the absence of products in the discharge line from said second storage.

35. A transfer mechanism comprising a first conveyor for a plurality of products, a second conveyor adapted to receive products from said first conveyor, first drive means for said first conveyor, second drive means for said second conveyor, first and second switches adjacent to said second conveyor adapted to be contacted by products thereon, said first switch being closed to actuate said first conveyor by the absence of products on said second conveyor, and said second switch being opened by the absence of products on said second conveyor to stop said second conveyor, and another switch closed by the actuation of said first conveyor to start said second conveyor substantially simultaneously therewith.

36. In a device of the type described, a transfer mechanism for supplying products to a packaging line, comprising a first conveyor and a second conveyor for receiving products therefrom, a signaling switch adjacent to said second conveyor for actuating said first conveyor to deliver products when the number of products in the packaging line is below a predetermined quantity, and a second switch adjacent to the second conveyor for stopping the packaging line when the number of products therein is below a predetermined quantity smaller than required to actuate said signaling switch.

37. A system for transferring and storing products from first processing means to meet the production requirements of second processing means, comprising a carrier having a plurality of product receiving surfaces, means above said surfaces for maintaining products thereon in spaced relation, other means adjacent to said surfaces forming an abutment preventing movement of products from said surfaces, first processing means including a transfer device for depositing products on said surfaces, and second processing means including a second transfer device responsive to an unloaded product condition thereof for selectively removing products from said surfaces.

38. Transfer and storage apparatus comprising a master storage conveyor including a plurality of spaced flights each of which is pivotally mounted on movable means, each flight having an upper surface adapted to receive and carry products in spaced relation, stop means on each flight for restricting product movement relative to the flight, first means for selectively loading a plurality of products on the flights of said master storage conveyor, second means for selectively removing a plurality of products from the flights of said master storage conveyor, each of said first and second means including an intermediate storage for a plurality of products, and means responsive to the presence and absence of products for automatically operating said first and second means.

References Cited in the file of this patent

UNITED STATES PATENTS

| | | |
|---|---|---|
| 1,554,765 | Shaffer | Sept. 22, 1925 |
| 1,575,282 | Schiff | Mar. 2, 1926 |
| 1,659,076 | Benoit | Feb. 14, 1928 |
| 1,812,390 | Wetmore | June 30, 1931 |
| 1,852,627 | Roberts | Apr. 5, 1932 |
| 2,271,436 | Lathrop | Jan. 27, 1942 |
| 2,336,287 | Paxton | Dec. 7, 1943 |
| 2,505,194 | Loss | Apr. 25, 1950 |
| 2,517,742 | Viall | Aug. 8, 1950 |
| 2,529,583 | Adams | Nov. 14, 1950 |
| 2,603,340 | Warren | July 15, 1952 |
| 2,783,867 | Hunter | Mar. 5, 1957 |